United States Patent
Taguchi et al.

(10) Patent No.: US 7,158,222 B2
(45) Date of Patent: Jan. 2, 2007

(54) METHOD AND DEVICE FOR EVALUATING SPECTACLE LENS OR MOLD FOR MOLDING SPECTACLE LENS, AND METHOD AND SYSTEM FOR MANUFACTURING SPECTACLE LENS

(75) Inventors: Shin-ichiro Taguchi, Tokyo (JP); Masaaki Matsushima, Tokyo (JP)

(73) Assignee: Hoya Corporation, Tokyo (JP)

( * ) Notice: Subject to any disclaimer, the term of this patent is extended or adjusted under 35 U.S.C. 154(b) by 301 days.

(21) Appl. No.: 10/509,906

(22) PCT Filed: May 16, 2003

(86) PCT No.: PCT/JP03/06138

§ 371 (c)(1),
(2), (4) Date: Sep. 28, 2004

(87) PCT Pub. No.: WO03/098181

PCT Pub. Date: Nov. 27, 2003

(65) Prior Publication Data

US 2005/0179863 A1    Aug. 18, 2005

(30) Foreign Application Priority Data

May 16, 2002    (JP)    .............................. 2002-141159

(51) Int. Cl.
G01B 9/00    (2006.01)
G02C 7/06    (2006.01)

(52) U.S. Cl. ...................... 356/127; 351/169; 351/177
(58) Field of Classification Search ........ 356/124–127; 351/169, 177
See application file for complete search history.

(56) References Cited

U.S. PATENT DOCUMENTS

| 5,825,476 A | 10/1998 | Abitol et al. |
| 6,222,621 B1 | 4/2001 | Taguchi |
| 6,412,947 B1 * | 7/2002 | Yanari ........................ 351/169 |
| 6,637,880 B1 * | 10/2003 | Yamakaji et al. ........... 351/177 |
| 2002/0008846 A1 | 1/2002 | Kelch et al. |

FOREIGN PATENT DOCUMENTS

JP    08-304228    11/1996

\* cited by examiner

*Primary Examiner*—Hoa Q. Pham
(74) *Attorney, Agent, or Firm*—Blakely Sokoloff Taylor & Zafman

(57) ABSTRACT

A dioptric power distribution measuring device (1) measures the dioptric power distribution of a target lens. A computer (3) constructs a design lens spatial model in a virtual space, and calculates the dioptric power distribution of the design lens spatial model by performing simulation processing for incident/exit light for only the same point in the design lens spatial model as a measurement point on the target lens. The computer then compares the calculated dioptric power distribution with the dioptric power distribution of the target lens which is measured by the dioptric power distribution measuring device (1).

18 Claims, 17 Drawing Sheets

DIOPTRIC POWER
DISTRIBUTION OF DESIGN
LENS SPATIAL MODEL

DIOPTRIC POWER
DISTRIBUTION OF
TARGET LENS

ERROR
DISTRIBUTION

⊙ WITHIN ±0.03D
● WITHIN ±0.06D
⊘ WITHIN ±0.12D
○ WITHIN ±0.25D
⊘ OVER ±0.25D

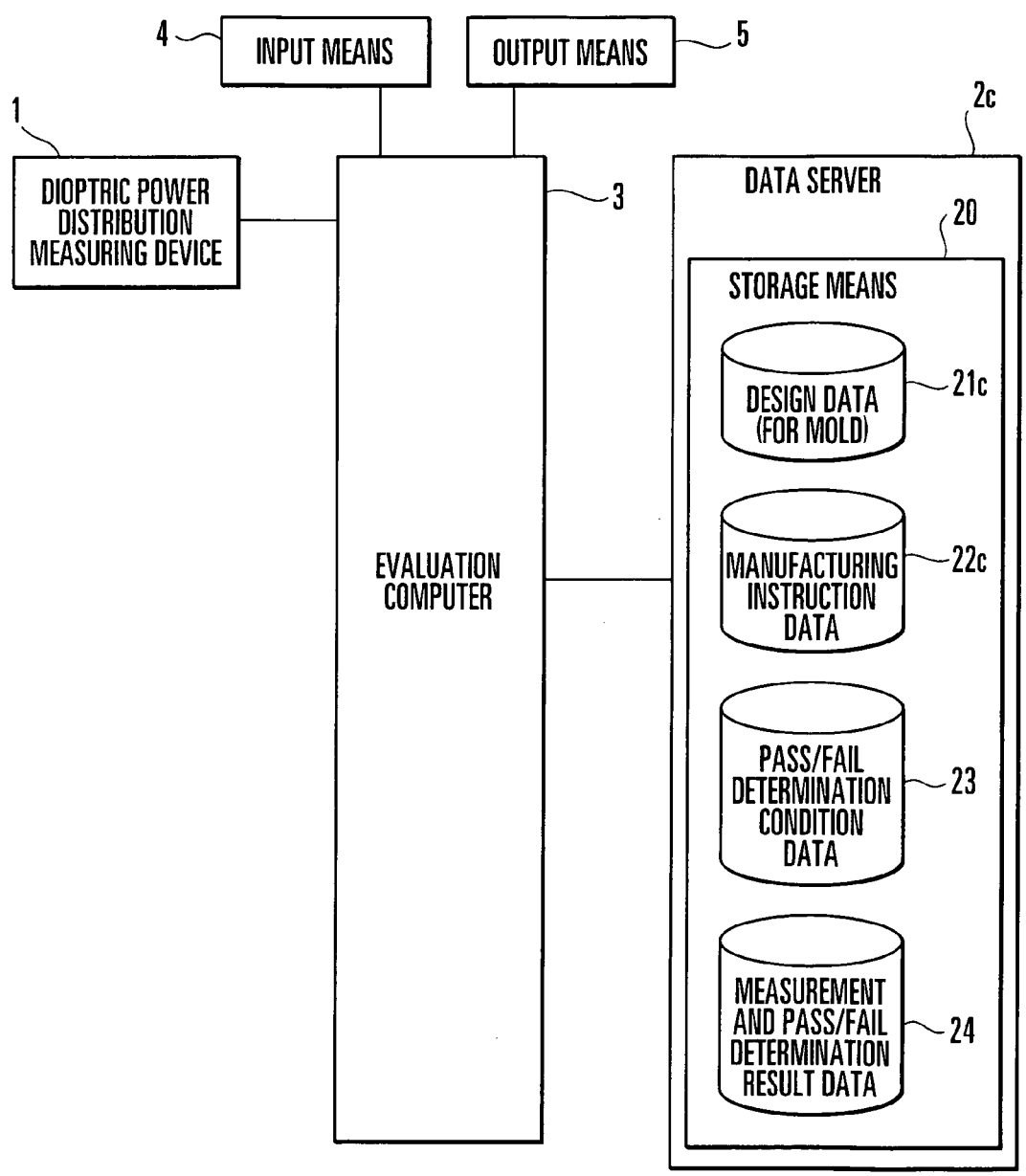
F I G. 20

METHOD AND DEVICE FOR EVALUATING SPECTACLE LENS OR MOLD FOR MOLDING SPECTACLE LENS, AND METHOD AND SYSTEM FOR MANUFACTURING SPECTACLE LENS

The present patent application is a non-provisional application of International Application No. PCT/JP03/06138, filed May 16, 2003.

BACKGROUND OF THE INVENTION

The present invention relates to an evaluation method and apparatus which evaluate the optical performance and surface shape of a spectacle lens or those of a mold used for spectacle lens molding, and a spectacle lens manufacturing method and system which use the evaluation method and apparatus.

A spectacle lens is manufactured and processed in accordance with optimized specifications from a designer. It is necessary to make an evaluation after manufacturing to check whether the finished spectacle lens complies with the specifications. As a method of measuring the optical performance of a spectacle lens, a measurement method using a lens meter is available. In measurement with the lens meter, the dioptric power or the like of a lens is measured by vertically projecting a parallel light beam on a lens surface. A lens meter for measuring an addition is also known. Measurements with these lens meters are generally spot measurements.

As greater importance has recently been placed on the optimization of peripheral vision (aberration), demands have arisen for the evaluation of the optical performance of a lens throughout a wide range. When controlling the quality of products, it is important to check how much error a lens manufactured on the basis of design data has with respect to the design data. Lens shapes greatly vary in terms of surface shape and material even with the same prescription. In addition, there has been a trend toward customization, resulting in diversification of lens shapes. In the case of customization, a lens shape is determined by a prescription presented at the time of an order received and other parameters (e.g., framing shape, lens material, and lens thickness). The lens is processed on basis of the design values. The resultant lens is then delivered to the customer. It is required to further shorten the time interval from the determination of a lens shape to the delivery of the lens by reducing time and labor required for tests.

In order to measure the optical performance of a lens in a wide range by using the above lens meter and compare it with design values, since spot measurement is performed with the lens meter as described above, measurement must be done at many points. This measurement requires much time and labor. In addition, the value measured by the lens meter is a dioptric power (refractive power), whereas design values are three-dimensional shape data. Therefore, the design values cannot be easily compared with the dioptric power actually measured by the lens meter. In performing such comparison, a dioptric power at each position in three-dimensional shape data as design values is calculated in advance, and each calculated dioptric power is compared with the dioptric power actually measured by the lens meter. As described above, however, since lenses have greatly diversified due to the trend of customization, it is practically difficult to calculate the dioptric powers of all lenses in wide ranges in advance.

Recently, there has been proposed an apparatus for measuring and evaluating the optical characteristics of a spectacle lens in a wide range. For example, an evaluation apparatus for measuring the three-dimensional shape of a lens is known as disclosed in Japanese Patent Laid-Open No. 2000-186978. However, this evaluation apparatus uses a contact type three-dimensional measuring device, a long time is required for measurement.

In addition, an apparatus for measuring the three-dimensional shape and dioptric power distribution of a lens in a noncontact manner is also known as disclosed in PCT(WO) 10-507825 and Japanese Patent Laid-Open No. 8-304228. Such an apparatus can measure the optical characteristics of a lens in a wide range within a short period of time. In order to compare measured values with design values, the optical characteristic based on design values must be calculated in advance. It is therefore difficult to calculate the optical characteristics of all kinds of lenses in great variety in advance.

A mold used for molding a spectacle plastic lens is made of glass, and its molding surface is transferred to a plastic lens. The molding surface of the mold must therefore have as high surface precision as that of the glass lens. Consequently, it is necessary to measure and evaluate the surface shape of the mold. Evaluating a mold poses the same problems as in the case of a lens.

SUMMARY OF THE INVENTION

The present invention has been made in consideration of the above points, and has as its object to provide an evaluation method and apparatus for a spectacle lens or a mold for spectacle lens molding, which can compare the optical performance based on design values for a spectacle lens or mold with the optical performance of a manufactured spectacle lens or mold in a wide range within a short period of time, and can display the comparison result.

According to the present invention, there is provided a spectacle lens evaluation method which executes the measurement step of, when a first surface of a target lens is irradiated with light, measuring optical paths of exit light beams emerging from a plurality of measurement points on a second surface on an opposite side, the target lens dioptric power distribution calculation step of calculating a dioptric power distribution of the target lens on the basis of the measurement result, the design lens spatial model construction step of constructing a design lens spatial model imitating optical characteristics of the target lens on the basis of design values registered in advance, the light exit position calculation step of calculating a light exit position on a first surface of the design lens spatial model, assuming that light directly opposite to the exit light having undergone optical path measurement is incident at the same position as the measurement point on a second surface of the design lens spatial model, the exit light optical path calculation step of calculating optical paths of exit light beams emerging from a plurality of measurement points on the second surface of the design lens spatial model, assuming that the same light as that in the measurement step is applied at the calculated light exit position of the design lens spatial model, the design lens dioptric power distribution calculation step of calculating a dioptric power distribution of the design lens spatial model on the basis of the calculated optical paths of the exit light beams, and the error distribution calculation step of calculating an error distribution of the dioptric power distribution of the target lens with respect to the dioptric power distribution of the design lens spatial model.

According to an arrangement example of the spectacle lens evaluation method of the present invention, the method executes the pass/fail determination step of determining "pass"/"fail" of the target lens by collating the error distribution calculated in the error distribution calculation step with a preset pass/fail determination condition, the pass/fail determination condition is constituted by determination area segmentation for segmenting the target lens into a plurality of determination areas, and an error allowable condition set for each of the determination areas segmented in accordance with the determination area segmentation, and in the pass/fail determination step, the error distribution is segmented into a plurality of determination areas in accordance with the determination area segmentation, and "fail" is determined if at least one of the error distributions segmented as the plurality of determination areas does not satisfy the error allowable condition.

In an arrangement example of the spectacle lens evaluation method of the present invention, the error allowable condition is constituted by a dioptric power allowable error set for each determination area, and an allowable ratio obtained by setting, for each determination area, an allowance for a ratio of the number of measurement points at which the allowable error is not satisfied to the total number of measurement points in the determination area, and in the pass/fail determination step, a ratio of the number of measurement points at which the allowable error is not satisfied is calculated for each determination area, and "fail" is determined if at least one of the ratios calculated for the respective determination areas does not satisfy the allowable ratio.

In an arrangement example of the spectacle lens evaluation method of the present invention, the stricter error allowable conditions are set for determination areas closer to an optical center of the target lens.

In an arrangement example of the spectacle lens evaluation method of the present invention, the stricter error allowable conditions are set for determination areas closer to distance and near portions of the target lens.

In an arrangement example of the spectacle lens evaluation method of the present invention, in the pass/fail determination step, only a frame area specified by frame shape data of the target lens is set as the determination area, and a portion located outside the frame area of the target lens is excluded from the pass/fail determination.

According to the present invention, there is provided a spectacle lens evaluation apparatus comprising a dioptric power distribution measuring device which, when a first surface of a target lens is irradiated with light, measures optical paths of exit light beams emerging from a plurality of measurement points on a second surface on an opposite side, and calculates a dioptric power distribution of the target lens on the basis of the measurement result, storage means for storing design values for the target lens, design lens spatial model construction means for constructing a design lens spatial model imitating optical characteristics of the target lens on the basis of the design values, light exit position calculation means for calculating a light exit position on a first surface of the design lens spatial model, assuming that light directly opposite to the exit light having undergone optical path measurement is incident at the same position as the measurement point on a second surface of the design lens spatial model, exit light optical path calculation means for calculating optical paths of exit light beams emerging from a plurality of measurement points on the second surface of the design lens spatial model, assuming that the same light as that in measurement by the dioptric power distribution measuring device is applied at the calculated light exit position of the design lens spatial model, design lens dioptric power distribution calculation means for calculating a dioptric power distribution of the design lens spatial model on the basis of the calculated optical paths of the exit light beams, and error distribution calculation means for calculating an error distribution of the dioptric power distribution of the target lens with respect to the dioptric power distribution of the design lens spatial model.

According to an arrangement example of the spectacle lens evaluation apparatus of the present invention, the apparatus comprises pass/fail determination condition storage means for storing a pass/fail determination condition constituted by determination area segmentation for segmenting the target lens into a plurality of determination areas, and an error allowable condition set for each of the determination areas segmented in accordance with the determination area segmentation, and pass/fail determination means for determining "pass"/"fail" of the target lens by collating the error distribution calculated by the error distribution calculation means with the pass/fail determination condition, and the pass/fail determination means segments the error distribution into a plurality of determination areas in accordance with the determination area segmentation, and determines "fail" if at least one of the error distributions segmented as the plurality of determination areas does not satisfy the error allowable condition.

In an arrangement example of the spectacle lens evaluation apparatus of the present invention, the error allowable condition is constituted by a dioptric power allowable error set for each determination area, and an allowable ratio obtained by setting, for each determination area, an allowance for a ratio of the number of measurement points at which the allowable error is not satisfied to the total number of measurement points in the determination area, and the pass/fail determination means calculates a ratio of the number of measurement points at which the allowable error is not satisfied for each determination area, and determines "fail" if at least one of the ratios calculated for the respective determination areas does not satisfy the allowable ratio.

In an arrangement example of the spectacle lens evaluation apparatus of the present invention, the stricter error allowable conditions are set for determination areas closer to an optical center of the target lens.

In an arrangement example of the spectacle lens evaluation apparatus of the present invention, the stricter error allowable conditions are set for determination areas closer to distance and near portions of the target lens.

In an arrangement example of the spectacle lens evaluation apparatus of the present invention, the pass/fail determination means sets only a frame area specified by frame shape data of the target lens as the determination area, and excludes a portion located outside the frame area of the target lens from the pass/fail determination.

According to the present invention, there is provided a spectacle lens manufacturing method of manufacturing a spectacle lens, comprising cutting/polishing a lens on the basis of order data from a spectacle lens orderer side, when a first surface of the cut/polished lens is irradiated with light, measuring optical paths of exit light beams emerging from a plurality of measurement points on a second surface on an opposite side, and calculating a dioptric power distribution of the ordered lens on the basis of the measurement result, calculating a design lens dioptric power distribution from design values for the ordered lens based on the order data, and evaluating the lens by calculating an error distribution of an actual dioptric power distribution with respect to the design lens dioptric power distribution.

According to the present invention, there is provided a spectacle lens manufacturing system comprising a computer placed on a spectacle lens orderer side, a manufacturer side computer which is so connected to receive order data sent from the orderer side computer, storage means for storing design values for an ordered lens based on the order data, a dioptric power distribution measuring device which, when a first surface of an ordered lens manufactured on the order data is irradiated with light, measures optical paths of exit light beams emerging from a plurality of measurement points on a second surface on an opposite side, and calculates a dioptric power distribution of the ordered lens on the basis of the measurement result, design lens dioptric power distribution calculation means for calculating a dioptric power distribution on the basis of the design values, and error distribution calculation means for calculating an error distribution of the dioptric power distribution measured by the dioptric power distribution measuring device with respect to the dioptric power distribution calculated by the design lens dioptric power distribution calculation means.

According to the present invention, there is provided a spectacle lens manufacturing method of manufacturing spectacle lenses, comprising molding a lens on the basis of manufacturing instruction data representing specifications of a lens to be manufactured, when a first surface of the molded lens is irradiated with light, measuring optical paths of exit light beams emerging from a plurality of measurement points on a second surface on an opposite side, calculating a dioptric power distribution of the lens on the basis of the measurement result, calculating a design lens dioptric power distribution from design values for the lens based on the manufacturing instruction data, and calculating an actual error distribution of a dioptric power distribution which corresponds the design lens dioptric power distribution, thus evaluating the lens.

According to the present invention, there is provided a spectacle lens manufacturing system for manufacturing spectacle lenses, comprising a computer which inputs manufacturing instruction data representing specifications of a lens to be manufactured, storage means for storing design values for a lens based on the manufacturing instruction data, a dioptric power distribution measuring device which, when a first surface of a lens manufactured on the basis of the manufacturing instruction data is irradiated with light, measures optical paths of exit light beams emerging from a plurality of measurement points on a second surface on an opposite side, and calculates a dioptric power distribution of the lens on the basis of the measurement result, design lens dioptric power distribution calculation means for calculating a dioptric power distribution on the basis of the design values, and error distribution calculation means for calculating an error distribution of the dioptric power distribution measured by the dioptric power distribution measuring device with respect to the dioptric power distribution calculated by the design lens dioptric power distribution calculation means.

According to the present invention, there is provided an evaluation method for a lens-like mold, which executes the measurement step of, when a first surface of a target mold is irradiated with light, measuring optical paths of exit light beams emerging from a plurality of measurement points on a second surface on an opposite side, the target mold dioptric power distribution calculation step of calculating a dioptric power distribution of the target mold on the basis of the measurement result, the design mold spatial model construction step of constructing a design mold spatial model imitating optical characteristics of the target mold on the basis of design values registered in advance, the light exit position calculation step of calculating a light exit position on a first surface of the design mold spatial model, assuming that light directly opposite to the exit light having undergone optical path measurement is incident at the same position as the measurement point on a second surface of the design mold spatial model, the exit light optical path calculation step of calculating optical paths of exit light beams emerging from a plurality of measurement points on the second surface of the design mold spatial model, assuming that the same light as that in the measurement step is applied at the calculated light exit position of the design mold spatial model, the design mold dioptric power distribution calculation step of calculating a dioptric power distribution of the design mold spatial model on the basis of the calculated optical paths of the exit light beams, and the error distribution calculation step of calculating an error distribution of the dioptric power distribution of the target mold with respect to the dioptric power distribution of the design mold spatial model.

According to the present invention, there is provided an evaluation apparatus for a lens-like mold, comprising a dioptric power distribution measuring device which, when a first surface of a target mold is irradiated with light, measures optical paths of exit light beams emerging from a plurality of measurement points on a second surface on an opposite side, and calculates a dioptric power distribution of the target mold on the basis of the measurement result, storage means for storing design values for the target mold, design mold spatial model construction means for constructing a design mold spatial model imitating optical characteristics of the target mold on the basis of the design values, light exit position calculation means for calculating a light exit position on a first surface of the design mold spatial model, assuming that light directly opposite to the exit light having undergone optical path measurement is incident at the same position as the measurement point on a second surface of the design mold spatial model, exit light optical path calculation means for calculating optical paths of exit light beams emerging from a plurality of measurement points on the second surface of the design mold spatial model, assuming that the same light as that in measurement by the dioptric power distribution measuring device is applied at the calculated light exit position of the design mold spatial model, design mold dioptric power distribution calculation means for calculating a dioptric power distribution of the design mold spatial model on the basis of the calculated optical paths of the exit light beams, and error distribution calculation means for calculating an error distribution of the dioptric power distribution of the target mold with respect to the dioptric power distribution of the design mold spatial model.

BRIEF DESCRIPTION OF DRAWINGS

FIG. 20 is a block diagram showing the schematic arrangement of a mold evaluation apparatus according to the fourth embodiment of the present invention.

DETAILED DESCRIPTION OF EMBODIMENTS

[First Embodiment]

Figure 1:
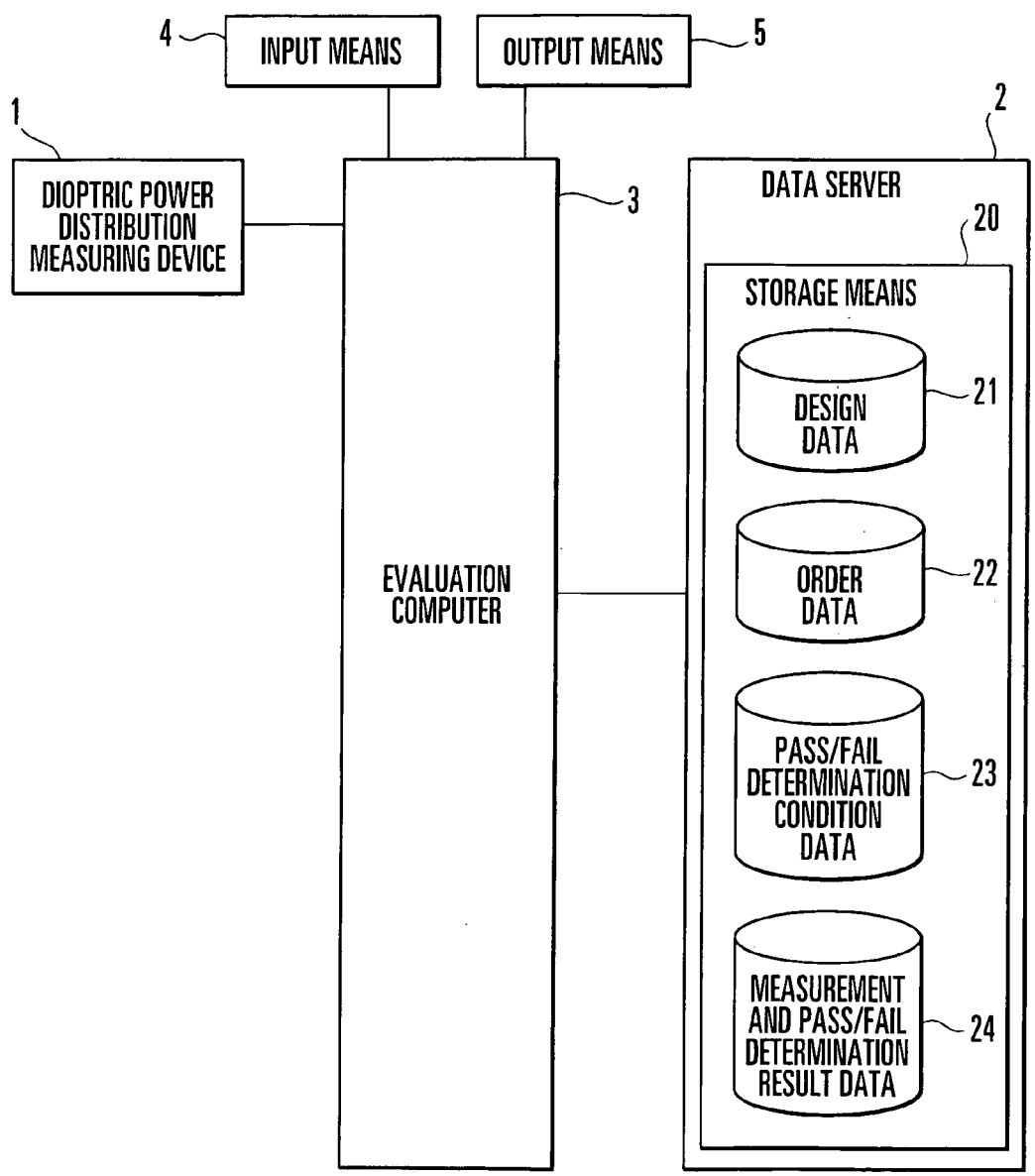
FIG. 1 is a block diagram showing the schematic arrangement of a spectacle lens evaluation apparatus according to the first embodiment of the present invention.

The embodiments of the present invention will be described below in detail below with reference to the accompanying drawings. FIG. 1 is a block diagram showing the schematic arrangement of a spectacle lens evaluation apparatus according to the first embodiment of the present invention. The spectacle lens evaluation apparatus of this embodiment is comprised of a dioptric power distribution measuring device 1 for measuring the dioptric power distribution of a target lens, a data server 2 which stores data necessary for the evaluation of the target lens and an evaluation result, an evaluation computer 3 for evaluating the target lens with respect to design values on the basis of the data stored in the data server 2 and the data measured by the dioptric power distribution measuring device 1, an input means 4 for inputting data for identifying the target lens to be measured to the evaluation computer 3, and an output means 5 for outputting the evaluation result obtained by the evaluation computer 3.

Figure 2:
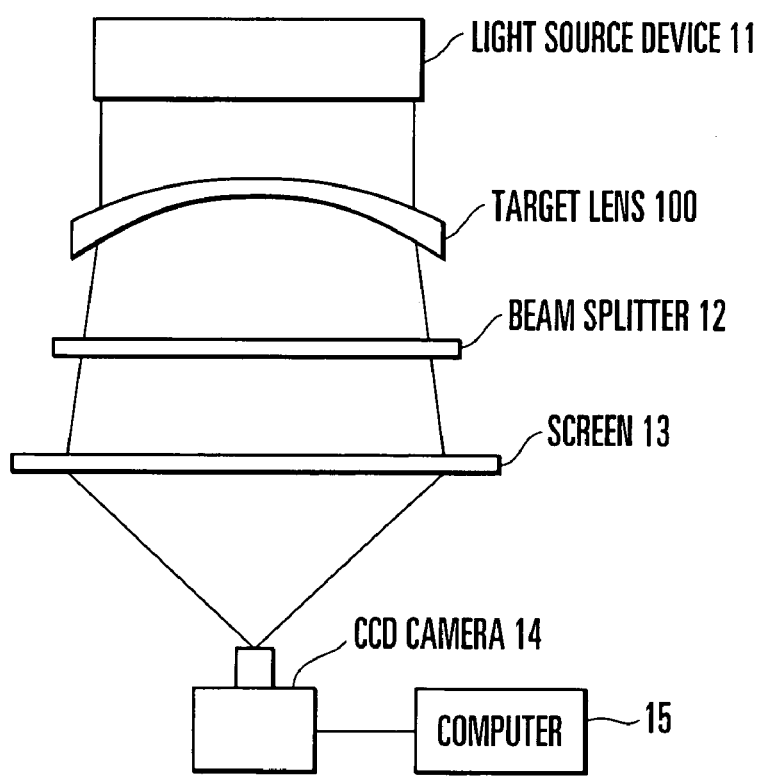
FIG. 2 is a block diagram showing the schematic arrangement of a dioptric power distribution measuring device according to the first embodiment of the present invention.

FIG. 2 shows the schematic arrangement of the dioptric power distribution measuring device 1. The dioptric power distribution measuring device 1 is comprised of a light source device 11 for irradiating a target lens 100 with parallel light, a beam splitter 12 which has a plurality of light-transmitting holes and is placed on the opposite side to the light source device 11 through the target lens 100, a screen 13 which light transmitted through the beam splitter 12 reaches, a CCD camera 14 for capturing a picture displayed on the screen 13, and a computer 15 for measuring the optical path of light transmitted through the target lens 100 from the data captured by the CCD camera 14 and calculating the optical characteristics of the target lens 100. The computer 15 may also serve as the evaluation computer 3.

The dioptric power distribution measuring device 1 measures the optical path of light which has been transmitted through the target lens 100 from the picture projected on the screen 13 upon irradiation of the lens with parallel light from the light source device 11, and calculates the optical characteristics of the target lens 100 from the measurement result. Note that in this embodiment, VM2500 available from Visionics was used as the dioptric power distribution measuring device 1.

The data server 2 is a computer having a data storage means connected to the evaluation computer 3 through a network. The data server 2 has a storage means 20 which stores data necessary for the evaluation of the target lens 100 and an evaluation result. The storage means 20 includes a design data storage means for storing design data 21 in advance, an order data storage means for storing order data 22 in advance, a pass/fail determination condition storage means for storing pass/fail determination condition data 23 in advance, and a pass/fail determination result storage means for storing measurement and pass/fail determination result data 24.

The design values for the target lens 100 are determined on the basis of the design data 21 and order data 22. The design data 21 includes the three-dimensional shape data of the convex and concave surfaces of the target lens 100, data about the thickness between the convex and concave surfaces of the lens such as the lens central thickness and prism value and material parameters such as the refractive index and Abbe number of the target lens 100. It is preferable that the three-dimensional shape data be expressed by a spline function.

The order data 22 includes prescription data (e.g., S power (spherical power), C power (cylindrical power), cylinder axis, prism, and addition), frame shape data, lens type data, and the like. The pass/fail determination condition data 23 is constituted by determination area segmentation data for segmenting the target lens 100 into a plurality of determination areas and error allowable condition data set for each of the determination areas segmented in accordance with the determination area segmentation data. The error allowable condition data is constituted by allowable error data obtained by setting an allowable dioptric power error for each determination area, and allowable ratio data obtained by setting, for each determination area, the allowance of the ratio of the number of measurement points at which the allowable error is not satisfied to the total number of measurement points in each determination area.

The evaluation computer 3 is connected to the dioptric power distribution measuring device 1 and also connected to the data server 2 through the network. The evaluation computer 3 has an interface with the interfaces of the dioptric power distribution measuring device 1, data server 2, input means 4, and output means 5, and also has a CPU, storage device, and the like.

The evaluation computer 3 serves as a design lens spatial model construction means for constructing a design lens spatial model imitating the design optical characteristics of the target lens 100 on the basis of design data and order data, a light exit position calculation means for calculating a light exit position on the first surface of the design lens spatial model by causing light directly opposite to exit light having undergone optical path measurement to be incident at the same position as a measurement point on the second surface of the design lens spatial model in a virtual space, an exit light optical path calculation means for calculating the optical path of each of exit light beams emerging from a plurality of measurement points on the second surface of the design lens spatial model by applying the same light as that in measurement by the dioptric power distribution measuring device to the calculated light exit position of the design lens spatial model in the virtual space, a design lens dioptric power distribution calculation means for calculating the dioptric power distribution of the design lens spatial model on the basis of the calculated optical paths of the exit light beams, an error distribution calculation means for calculating the error distribution of the dioptric power distribution of the target lens 100 with respect to the dioptric power distribution of the design lens spatial model, and a pass/fail determination means for determining the pass/fail status of the target lens 100 by collating the error distribution calculated by the error distribution calculation means with the pass/fail determination condition.

The input means 4 is designed to input identification data unique to the target lens 100 to the evaluation computer 3. As the input means 4, for example, a bar code reader, a keyboard, or a means for receiving identification data sent from another apparatus is available.

The output means 5 displays or outputs, as data, the dioptric power distribution of the design lens, the dioptric power distribution of the target lens 100 measured by the dioptric power distribution measuring device 1, the error distribution of the target lens 100 with respect to the design lens, the pass/fail determination result based on the error distribution, and the like. As the output means 5, for example, a display device, a printer, or a means for outputting a result as data to another apparatus is available.

Figure 3:
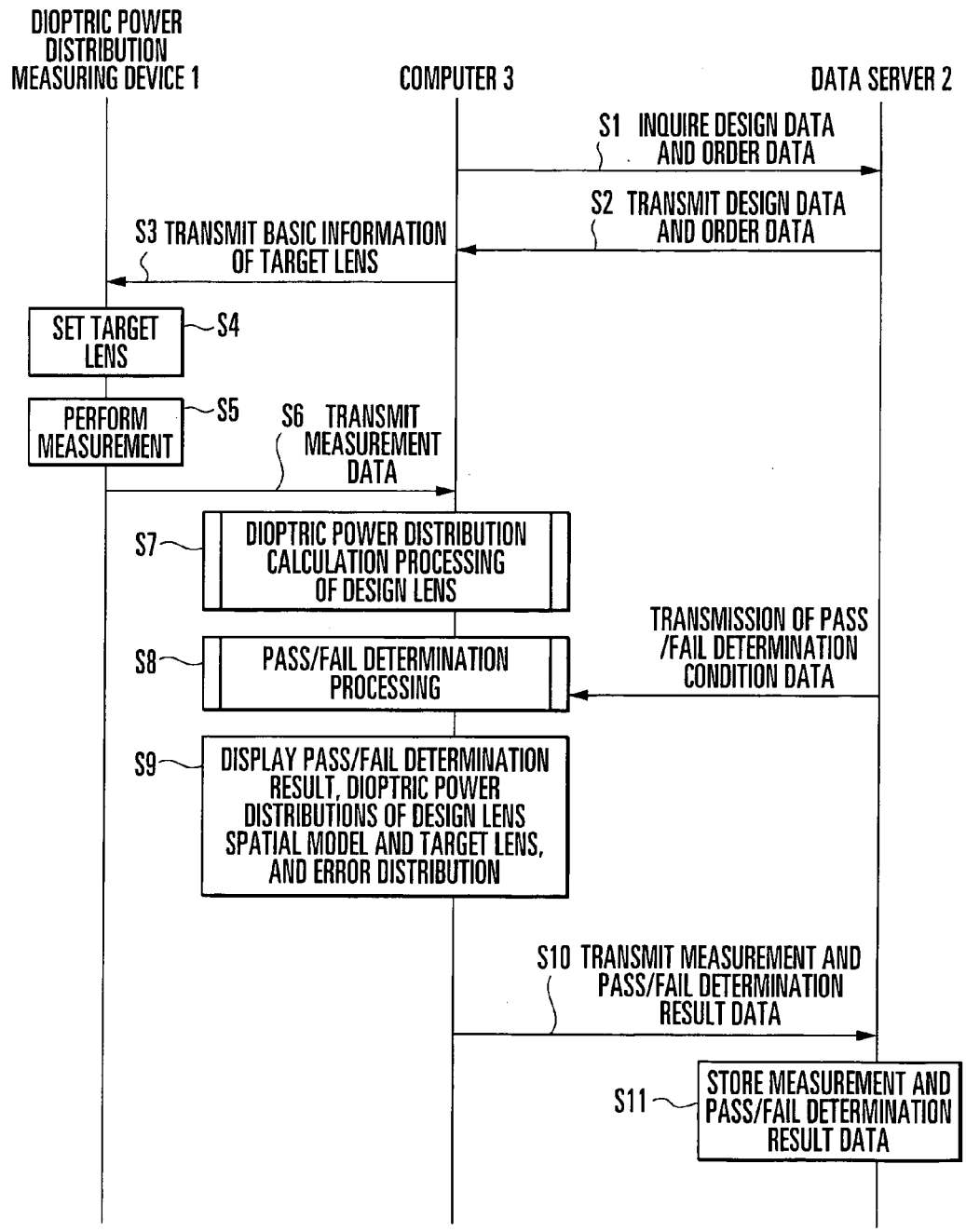
FIG. 3 is a sequence chart showing the operation of the spectacle lens evaluation apparatus in FIG. 1.

The operation of the above spectacle lens evaluation apparatus will be described next. FIG. 3 is a sequence chart showing the operation of the spectacle lens evaluation apparatus. First of all, the bar code of an instruction attached to the target lens 100 as a measurement target is read by the input means (bar code reader) 4 and sent to the evaluation computer 3. The evaluation computer 3 sends the identification data indicated by the bar code read by the input means 4 to the data server 2 on the network so as to inquire the design data 21 and order data 22 of the target lens 100 corresponding to the identification data (step S1 in FIG. 3).

Upon reception of the identification data from the evaluation computer 3, the data server 2 extracts the design data 21 and order data 22 of the target lens 100 corresponding to the identification data from the storage means 20, and transmits the data to the evaluation computer 3 (step S2). The evaluation computer 3 transmits, to the dioptric power distribution measuring device 1, the basic information (e.g., three-dimensional shape data of concave surface, lens central thickness, and outer diameter of lens) of the target lens 100, of the design data 21 and order data 22 received from the data server 2, which is necessary for measurement by the dioptric power distribution measuring device 1 (step S3).

When the target lens 100 as a measurement target is set in the dioptric power distribution measuring device 1 (step S4), the dioptric power distribution measuring device 1 measures the dioptric power distribution of the target lens 100 (step S5) and transmits the measurement data to the evaluation computer 3 (step S6). As described above, in the dioptric power distribution measuring device 1, the beam splitter 12 having a plurality of light-transmitting holes is placed between the target lens 100 and the screen 13. The light which has passed through the target lens 100 is split into a plurality of light beams by the beam splitter 12. As a consequence, a plurality of light spots corresponding to the plurality of light-transmitting holes are projected on the screen 13.

Figure 4:
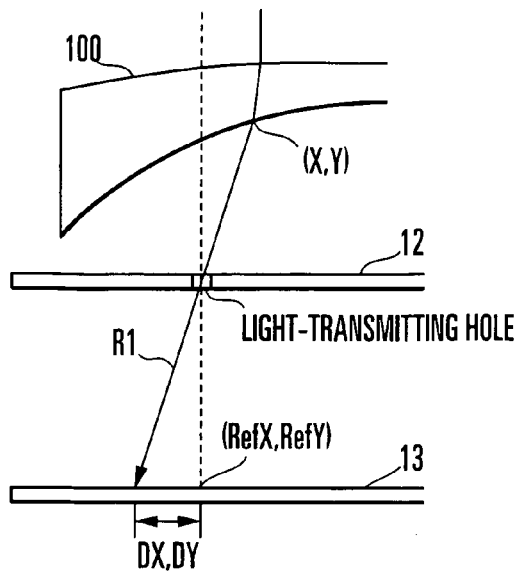
FIG. 4 is a view for explaining measurement data output from the dioptric power distribution measuring device.

FIG. 4 is a view for explaining measurement data output from the dioptric power distribution measuring device 1. The dioptric power distribution measuring device 1 outputs the following as measurement data: reference coordinates RefX and RefY indicting the position of a light spot (to be referred to as a calibration spot hereinafter) on the screen 13 in the absence of the target lens 100, coordinates X and Y indicating a position (to be referred to as a measurement point hereinafter) at which light from the light source device 11 emerges from that surface of the target lens 100 which is located on the beam splitter side, deviations DX and DY between the position of a light spot (to be referred to as a measurement spot hereinafter) on the screen 13 in the presence of the target lens 100 and the position of the corresponding calibration spot (the calibration spot which has passed through the same light-transmitting hole through which the measurement spot has passed), and the dioptric power calculated on the basis of the optical path of light which has passed through the target lens 100.

Since the reference coordinates RefX and RefY, coordinates X and Y, deviations DX and DY, and dioptric power are output for each spot, the dioptric power at the coordinates X and Y of each measurement point of the target lens 100, i.e., a dioptric power distribution, can be obtained.

Figure 5:
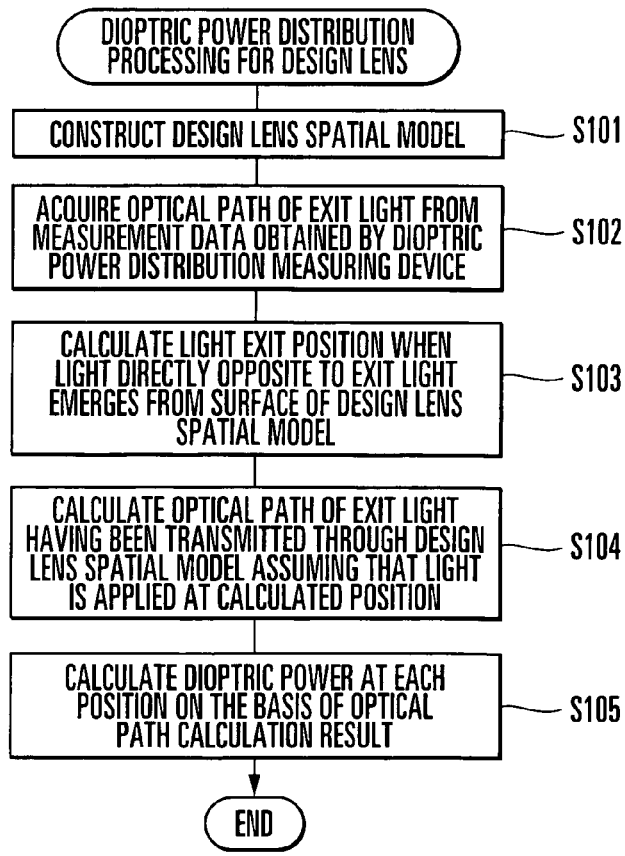
FIG. 5 is a flow chart showing dioptric power distribution calculation processing for a design lens.

Upon reception of the measurement data from the dioptric power distribution measuring device 1, the evaluation computer 3 performs a dioptric power distribution calculation processing for the design lens (step S7). FIG. 5 is a flow chart showing dioptric power distribution calculation processing for the design lens. In dioptric power distribution calculation processing, the evaluation computer 3 constructs a design lens spatial model from the design data 21 and order data 22 of the target lens 100, received from the data server 2, and the measuring device unique parameters of the dioptric power distribution measuring device 1 (step S101 in FIG. 5).

Figure 6A:
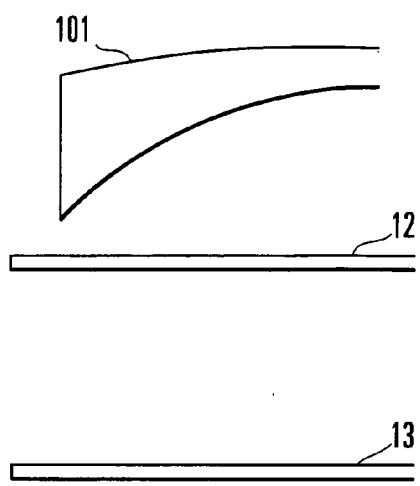
FIG. 6A is a view for explaining construction processing for a design lens spatial model.

The measuring device unique parameters include the distance between the target lens 100 and the beam splitter 12, the distance between the beam splitter 12 and the screen 13, and the like. A design lens spatial model 101 is used to simulate the design optical characteristics of the target lens 100 on the basis of the design data 21 and order data 22. As shown in FIG. 6A, the design lens spatial model 101 is used to simulate, on the evaluation computer 3, a state wherein the design lens is set in the dioptric power distribution measuring device 1 in a virtual space.

The evaluation computer 3 then performs incident/exit light simulation processing. In this incident/exit light simulation processing, the evaluation computer 3 acquires the optical path (R1 in FIG. 4) of exit light having been transmitted through the target lens, which has been measured by the dioptric power distribution measuring device 1 (step S102).

An optical path R1 of this exit light can be obtained from the reference coordinates RefX and RefY of the measurement data, the deviations DX and DY, and the distance between the beam splitter 12 and the screen 13. The evaluation computer 3 acquires an optical path like the optical path R1 for each of the exit light beams split by the beam splitter 12.

Figure 6B:
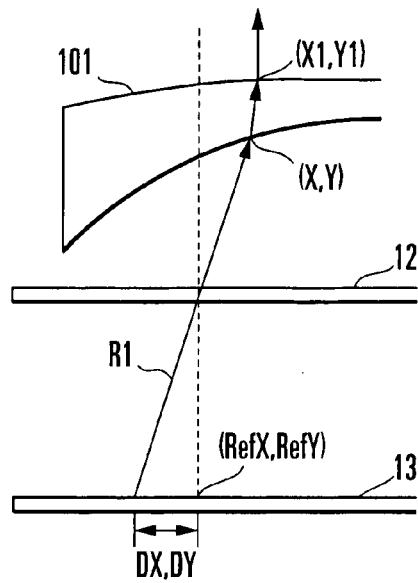
FIGS. 6B and 6C are views for explaining simulation processing for incident/exit light.

Subsequently, the evaluation computer 3 applies the acquired optical path R1 to the design lens spatial model 101 in FIG. 6A, and traces back the optical path R1 as shown in FIG. 6B, thereby calculating coordinates X1 and Y1 indicating the position of exit light emerging from that surface of the model 101 which is located on the light source device side, assuming that light directly opposite to the exit light with the optical path R1 is caused to be incident on that surface of the design lens spatial model 101 which is located on the beam splitter side (step S103). The evaluation computer 3 calculates coordinates like the coordinates X1 and Y1 for each of the optical paths R1 of exit light beams which are acquired in step S102.

Figure 6C:
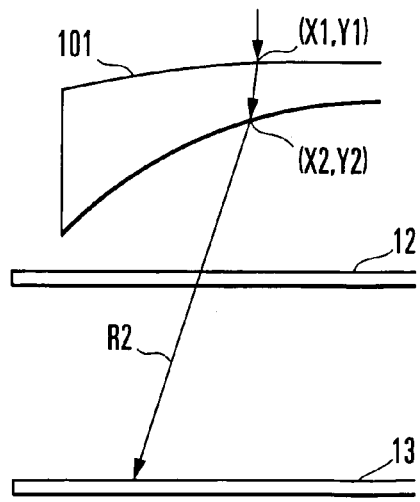

The evaluation computer 3 then sets the calculated coordinates X1 and Y1 as incident position coordinates and calculates an optical path R2 of exit light having been transmitted through the design lens spatial model assuming that the incident position coordinates X1 and Y1 of the design lens spatial model 101 are irradiated with the same light as that used at the time of measurement from the light source device 11 as shown in FIG. 6C (step S104). The evaluation computer 3 calculates an optical path like the optical path R2 for each set of coordinates X1 and Y1 calculated in step S103.

The simulation processing for incident/exit light is completed in steps S102 to S104. The evaluation computer 3 then calculates a dioptric power distribution at the coordinates X and Y of the respective measurement points on the basis of the optical paths R2 calculated in the simulation processing for incident/exit light by using the Zernike polynomial (step S105).

Figure 7:
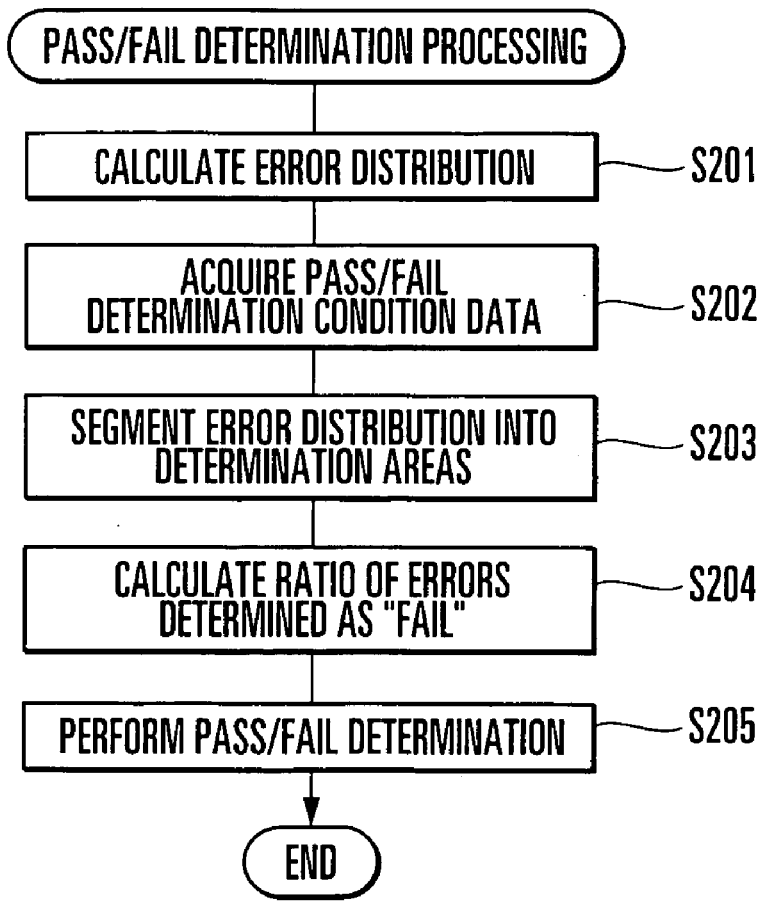
FIG. 7 is a flow chart showing pass/fail determination processing.

With the above operation, the dioptric power distribution calculation processing for the design lens is completed. Subsequently, the evaluation computer 3 performs pass/fail determination processing (step S8 in FIG. 3). FIG. 7 is a flow chart showing pass/fail determination processing. In the pass/fail determination processing, the evaluation computer 3 calculates an error distribution which is the difference between the calculated dioptric power distribution of the design lens spatial model 101 and the dioptric power distribution of the target lens 100 which is measured by the dioptric power distribution measuring device 1 (step S201 in FIG. 7). An error may be calculated by obtaining the difference between the dioptric power of the design lens spatial model 101 and that of the target lens 100 at the same measurement point coordinates X and Y.

The evaluation computer 3 then acquires the pass/fail determination condition data 23 from the data server 2 (step S202). The evaluation computer 3 segments the error distribution calculated in step S201 into a plurality of determination areas determined by the determination area segmentation data in the pass/fail determination condition data 23 (step S203).

Letting N be the total number of measurement point coordinates X and Y in one determination area, and M be the number of measurement point coordinates X and Y, of the measurement points in the determination area, at which the errors calculated in step S201 exceed the value of allowable error data set for the determination area, the evaluation computer 3 calculates a ratio P (=M×100/N) of the number of measurement points at which the errors exceed the allowable error to the total number of measurement points in the determination area (step S204). The evaluation computer 3 calculates such a ratio for each determination area. The evaluation computer 3 then performs pass/fail determination (step S205). That is, the evaluation computer 3 determines for each determination area whether the ratio P calculated in one determination area exceeds the value of allowable ratio data set for the determination area. If there is at least one determination area where the ratio P exceeds the value of the allowable ratio data, the evaluation computer 3 determines "fail". If there is no determination area where the ratio P exceeds the value of the allowable ratio data, the evaluation computer 3 determines "pass". With the above operation, the pass/fail determination processing is completed.

Figure 8A:
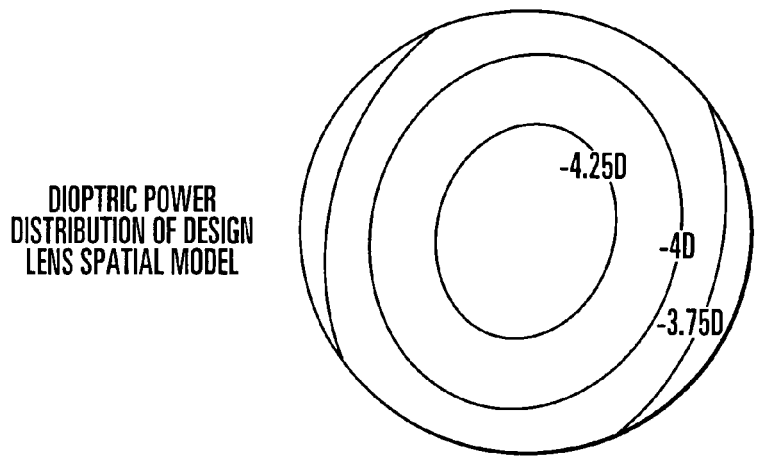
FIG. 8A is a view showing a dioptric power distribution image of a design lens.
Figure 8B:
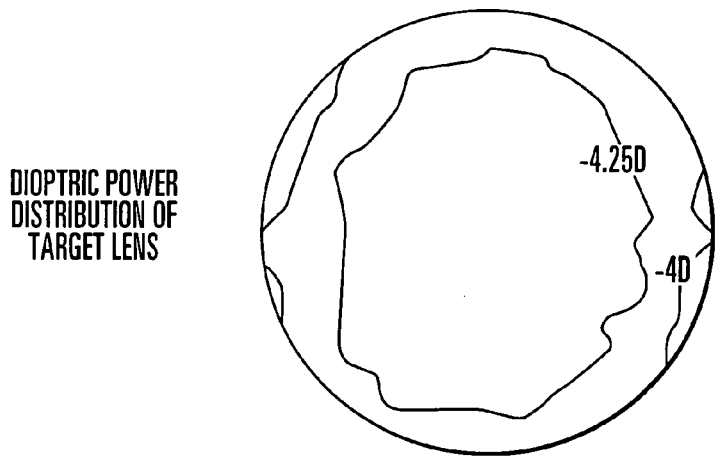
FIG. 8B is a view showing a dioptric power distribution image of a target lens.
Figure 8C:
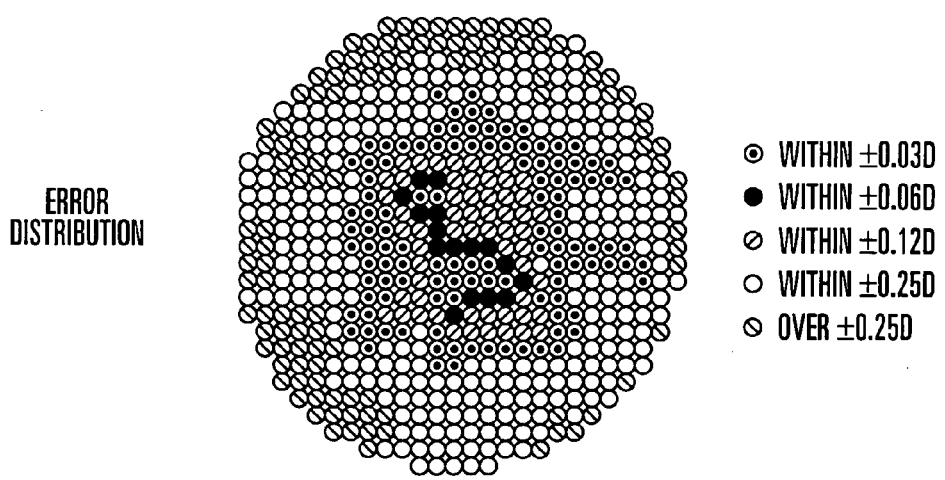
FIG. 8C is a view showing an error distribution image of the target lens.

The evaluation computer 3 causes the output means 5 to display the pass/fail determination result, a dioptric power distribution image (FIG. 8A) expressing the calculated dioptric power distribution of the design lens spatial model 101 in contour lines, a dioptric power distribution image (FIG. 8B) representing the dioptric power distribution of the target lens 100, measured by the dioptric power distribution measuring device 1, in contour lines, and an error distribution image (FIG. 8C) expressing the magnitudes of errors in different colors (step S9 in FIG. 3).

Finally, the evaluation computer 3 transmits the measurement and pass/fail determination result data 24 constituted by the measurement data received from the dioptric power distribution measuring device 1 and the pass/fail determination result representing "pass" or "fail" to the data server 2 (step S10). The data server 2 stores the measurement and pass/fail determination result data 24 received from the evaluation computer 3 in the storage means 20 (step S11).

Figure 9:
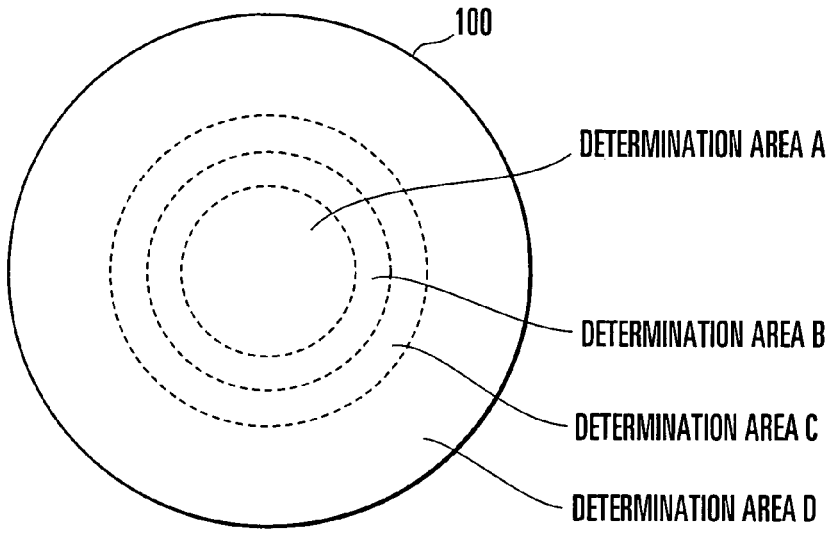
FIG. 9 is a plan view for explaining an example of the method of setting determination areas and allowable errors.

To set determination areas and allowable errors to be registered in the data server 2 in advance, various methods are conceivable. FIG. 9 is a plan view for explaining a method of setting determination areas and allowable errors when the target lens 100 is a single-vision lens. When the target lens 100 is a single-vision lens, the target lens 100 is segmented into four areas, i.e., determination areas A, B, C, and D. Assume that higher degrees of importance are placed on the areas closer to the optical center of the lens, i.e., the degrees of importance of the determination areas A, B, C, and D decrease in the order named. Stricter allowable errors are set for determination areas with higher degrees of importance. Note that in FIG. 9, the optical center coincides with the geometric center.

Figure 10:
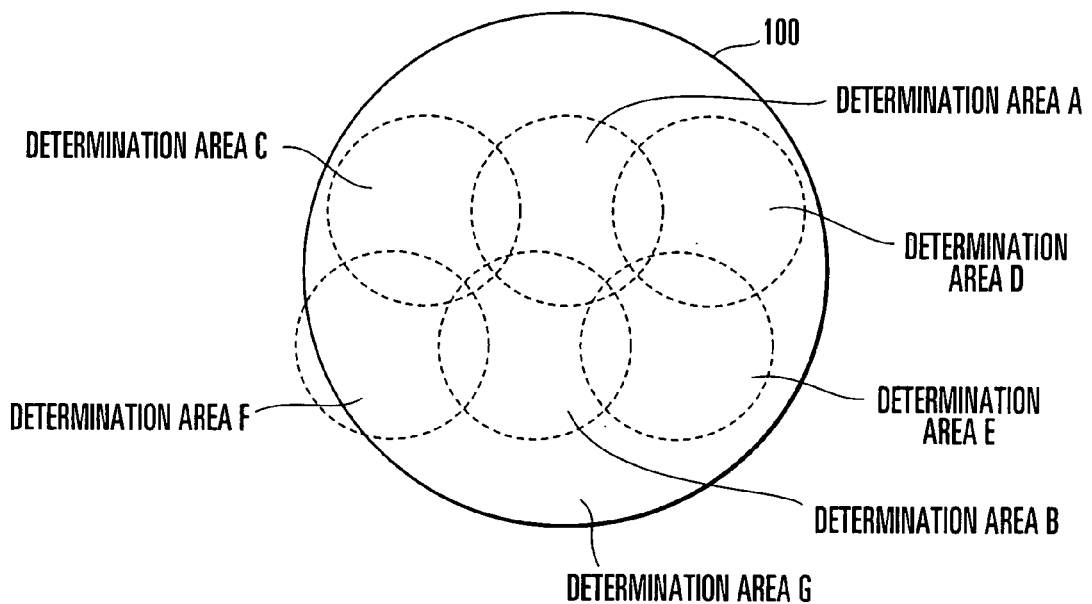
FIG. 10 is a plan view for explaining another example of the method of setting determination areas and allowable errors.

FIG. 10 is a plan view for explaining a method of setting determination areas and allowable errors when the target lens 100 is a multifocal lens (including a progressive-power lens; ditto for the following). When the target lens 100 is a multifocal lens, the target lens 100 is segmented into seven areas, i.e., determination areas A, B, C, D, E, F, and G, as shown in FIG. 10. The determination area A includes the distance portion of the lens, and the determination area B includes the near portion of the lens. Higher degrees of importance are placed on areas closer to the distance portion and near portion of the lens. For example, the degrees of importance of the determination areas A, B, C, D, E, F, and G decrease in the order named. Stricter allowable errors are set for determination areas with higher degrees of importance.

Figure 11:
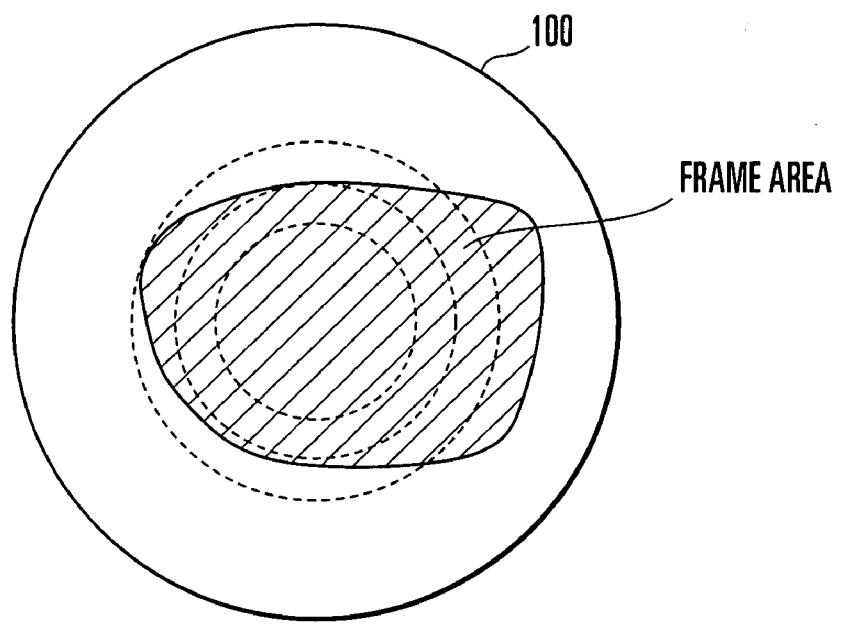
FIG. 11 is a plan view for explaining an evaluation method targeted to only a frame area.

In the above description, the dioptric powers of the entire area of the target lens 100 are evaluated. However, since the target lens 100 is edged in accordance with the shape of a spectacle frame after the test, dioptric powers may be evaluated only within the frame area (the hatched portion in FIG. 11) of the target lens 100, with the portion other than the frame area being excluded from evaluation.

Frame shape data is stored as the order data 22 in the data server 2. In the processing in step S203, therefore, only the frame area represented by the order data 22 may be set as a target area to be segmented into determination areas, and may be segmented into determination areas by using the determination area segmentation data of the pass/fail determination condition data 23. Excluding the portion other than the frame area of the target lens 100 from evaluation will further shorten the test time.

According to the first embodiment described above, the first surface of a target lens is irradiated with light, and the optical paths of exit light beams emerging from a plurality of measurement points on the second surface on the opposite side are measured, thereby calculating the dioptric power distribution of the target lens on the basis of the measurement result. This can greatly shorten the measurement time as compared with a case wherein a contact type three-dimensional measuring device is used. In addition, a design lens spatial model is constructed in a virtual space on the basis of design values. Light directly opposite to exit light having undergone optical path measurement is caused to be incident at the same position as a measurement point on the second surface of the design lens spatial model, and a light exit position on the first surface of the design lens spatial model is calculated. The same light as that used in the measurement sequence is applied at the calculated light exit position of the design lens spatial model, and the optical paths of exit light beams emerging from a plurality of measurement points on the second surface of the design lens spatial model are calculated. The dioptric power distribution of the design lens spatial model is calculated on the basis of the calculated optical paths of the exit light beams. The error distribution of the dioptric power distribution of the target lens with respect to the dioptric power distribution of the design lens spatial model is then calculated. With this operation, in the design lens spatial model constructed in the virtual space, simulation processing for incident/exit light is performed with respect to only the same point as a measurement point of the target lens, thereby calculating the dioptric power distribution of the design lens spatial model. The calculated dioptric power distribution is compared with the dioptric power distribution of the target lens measured by the dioptric power distribution measuring device. This makes it possible to easily and quickly calculate the dioptric power distribution of the design lens. As a consequence, the optical characteristics of various kinds of target lenses in a wide range can be tested in a short period of time.

In addition, according to the first embodiment, setting stricter error allowable conditions for determination areas closer to the optical center of a target lens makes it possible to set determination areas and allowable errors in accordance with a single-vision lens. Setting stricter error allowable conditions for determination areas closer to the distance and near portions of a target lens makes it possible to set determination areas and allowable errors in accordance with a multifocal lens.

Furthermore, according to the first embodiment, the test time can be further shortened by setting only the frame area specified by the frame shape data of a target lens as determination areas while excluding the portion other than the frame area of the target lens from pass/fail determination.

[Second Embodiment]

This embodiment is associated with a spectacle lens manufacturing method and system in which the lens evaluation method and apparatus according to the first embodiment are applied to the manufacture of spectacle plastic lenses. The embodiment exemplifies a case wherein a custom-designed lens is manufactured by processing a lens in accordance with an order from an orderer so as to meet the specifications. The second embodiment will be described in detail below with reference to the accompanying drawings.

Figure 12:
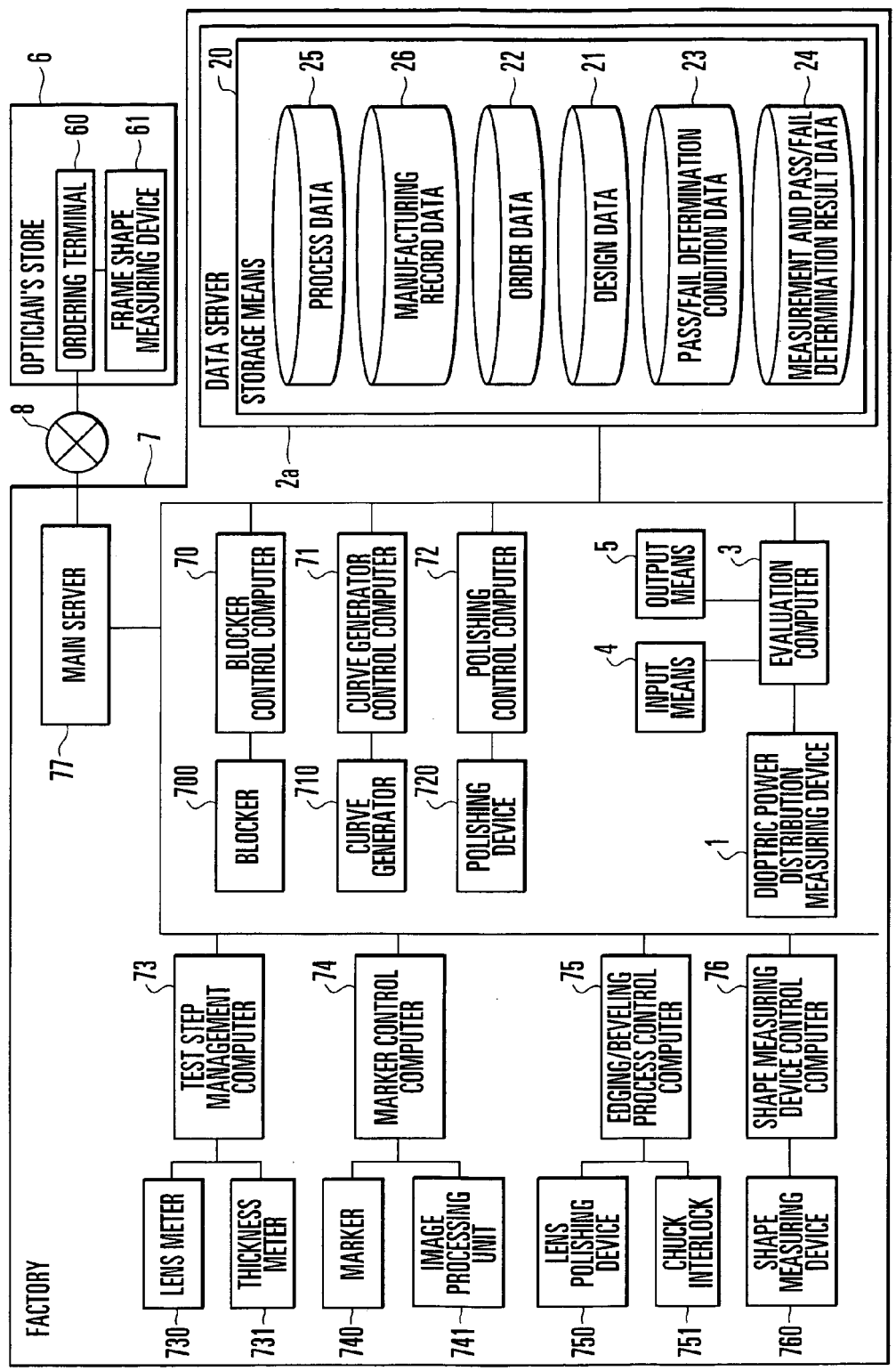
FIG. 12 is a block diagram showing the schematic arrangement of a custom-designed spectacle lens manufacturing system according to the second embodiment of the present invention.

FIG. 12 is a block diagram showing the schematic arrangement of a custom-designed spectacle lens manufacturing system according to the second embodiment of the present invention. FIG. 12 shows an optician's store 6 as an orderer side, and a factory 7 of a lens maker as a lens processing side. They are connected to each other through a communication medium 8. As the communication medium 8, for example, a public communication line or dedicated line is available. Alternatively, the Internet may be used. In addition, the communication medium 8 may have a relay station at some midway point. Although the optician's store 6 will be exemplified as an orderer side, the present invention is not limited to this. For example, the orderer side may be an ophthalmologist, an individual, or a business office of a lens maker. Although FIG. 12 shows only one orderer side, many orderer sides are connected to the communication medium 8 in practice.

The optician's store 6 has a computer 60 serving as an online ordering terminal and a frame shape measuring device 61. The ordering terminal 60 has an input device such as a keyboard and an image display device such as a CRT, and also has a communication means to be connected to the factory 7 side through the communication medium 8. The ordering terminal 60 is a terminal for transmitting/receiving information necessary for ordering lenses and spectacles. This terminal may be a dedicated terminal or a general-purpose personal computer in which software for lens ordering is installed. In addition, a WWW (World Wide Web) server may be provided for a network on the factory 7 side or relay station, and an ordering document registered in the WWW server may be displayed on the screen of the ordering terminal 60 by using a WWW browser, thereby allowing ordering operation.

The factory 7 includes a dioptric power distribution measuring device 1 for measuring the optical performance of an ordered lens throughout a wide range, an evaluation computer 3 for calculating the optical performance of the ordered lens on the basis of design values and comparing the optical performance based on the design values with the actual optical performance measured by the dioptric power distribution measuring device 1 in a wide range of the lens, thereby evaluating the lens, an input means 4 for inputting data for identifying a lens to the evaluation computer 3, an output means 5 for outputting the evaluation result obtained by the evaluation computer 3, and a data server 2a which is a computer for storing data necessary for the evaluation of an ordered lens (order data 22, design data 21, and pass/fail determination condition data 23), lens measurement/evaluation results, and lens manufacturing information in each lens manufacturing step. The factory 7 further includes a blocker control computer 70, a blocking device (to be referred to as a blocker hereinafter) 700 controlled/managed by the blocker control computer 70, a curve generator control computer 71, a curve generator 710 controlled/managed by the curve generator control computer 71, a polishing control computer 72, a polishing device 720 controlled/managed by the polishing control computer 72, a test step management computer 73, a lens meter 730 and thickness meter 731 controlled/managed by the test step management computer 73, a marker control computer 74, a marker 740 and image processing unit 741 controlled/managed by the marker control computer 74, an edging/beveling process control computer 75, a lens polishing device 750 and chuck interlock 751 controlled/managed by the edging/beveling process control computer 75, a shape measuring device control computer 76, a shape measuring device 760 controlled/managed by the shape measuring device control computer 76, and a main server 77 which is a computer for communicating with the ordering terminal 60 to receive an order from the ordering terminal 60 and provide information necessary for lens manufacturing to the blocker control computer 70, curve generator control computer 71, polishing control computer 72, test step management computer 73, marker control computer 74, edging/beveling process control computer 75, and shape measuring device control computer 76.

In this embodiment, the blocker control computer 70, curve generator control computer 71, polishing control computer 72, test step management computer 73, marker control computer 74, edging/beveling process control computer 75, and shape measuring device control computer 76 will be generically called device control computers. The main server 77, data server 2a, evaluation computer 3, and device control computers are connected to each other through a network.

The portions corresponding to the spectacle lens evaluation apparatus described in the first embodiment, i.e., the dioptric power distribution measuring device 1, data server 2a, evaluation computer 3, input means 4, and output means 5 are the same as those in the first embodiment, and hence a description thereof will be omitted. Note that the data server 2a is identical to the data server 2 in the first embodiment except that process data 25 and manufacturing record data 26 are recorded on a storage means 20. As the process data 25, process information for each lens which is sent from each device control computer is recorded. As the manufacturing record data 26, manufacturing information for each lens in each step which is sent from each device control computer is recoded. The respective devices controlled/managed by the device control computers will be described later. Note that the network arrangement on the factory 7 side is not limited to that in this embodiment, and the functions of the respective computers may be integrated and distributed in and to computers and network devices on the network.

Figure 13:
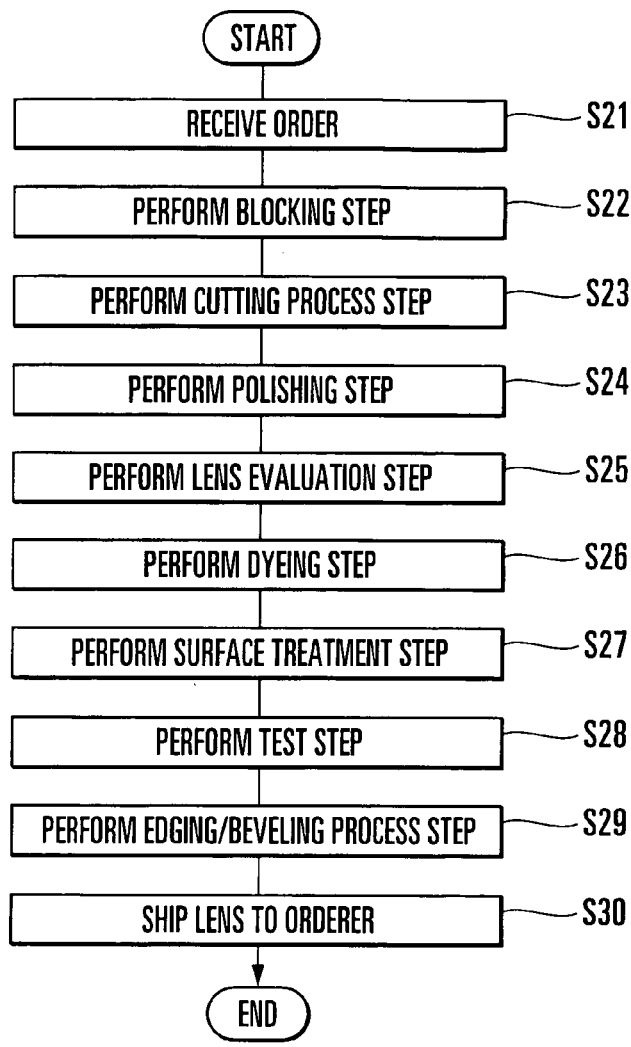
FIG. 13 is a flow chart showing the flow of lens manufacturing steps from order receiving operation to shipment in the second embodiment of the present invention.

The flow of processing from ordering operation to the manufacture and shipment of a lens will be described next. FIG. 13 is a flow chart showing the flow of a lens manufacturing process from order receiving operation to the shipment of a lens.

Order receiving operation in step S21 in FIG. 13 will be described first. When the ordering program in the ordering terminal 60 installed in the optician's store 6 is activated, the ordering terminal 60 is connected to the factory 7 side, and an order entry window is displayed on the screen display device of the ordering terminal 60. A spectacle lens order receiving system program is installed in the main server 77 on the factory 7 side. Pieces of information about spectacle lenses and spectacle frames that can be ordered and other pieces of information necessary for ordering operation are sent to the ordering terminal 60 by this program. With reference to these pieces of information, an operator in the optician's store 6 inputs pieces of information about a spectacle lens and spectacle frame to be ordered, prescription values, layout information, and the like by using the input device of the ordering terminal 60 while watching the order entry window.

Information about a spectacle lens includes information associated with a lens type (e.g., product identification symbol, lens material, refractive index, optical designs of lens upper and lower surfaces, lens outer diameter, lens color, and coating) and information associated with a lens processing instruction (e.g., lens thickness, edge thickness, decentration, execution/non-execution of edging/beveling process, and manner of beveling). Information about a spectacle frame includes a product identification symbol, frame size, frame material, color, shape, type of lens shape, actual spectacle frame measurement values measured by a frame shape measuring device, and the like. Prescription values include an S power, C power, prism, addition, and the like. Layout information includes a interpupillary distance, near interpupillary distance, SEGMENT lens position, eye point position, and the like.

The information input to the ordering terminal 60 is sent to the factory 7 side through the communication medium 8. The main server 77 includes a spectacle lens processing design program as well as the above spectacle lens order receiving system program. When order information is sent from the ordering terminal 60, the spectacle lens processing design program is activated through the spectacle lens order receiving system program, thereby computing a desired lens shape including a beveled shape. Upon determining on the basis of the computation result that lens processing is unfeasible, the main server 77 prompts the ordering terminal 60 to correct the order input values. If the lens processing is feasible, the order is confirmed.

When the order is confirmed, the order information sent from the ordering terminal 60 is stored as the order data 22 in the storage means 20 of the data server 2a. In addition, when the order is confirmed, the information associated with the lens shape computed by the spectacle lens processing design program is stored as the design data 21 in the storage means 20 of the data server 2a. The spectacle lens processing design program also computes lens processing design values in the respective steps and determines process conditions (e.g., various device set values and jigs to be used) for the lens processing on the basis of the process design values. These pieces of information associated with the lens processing (process set values and process conditions) are stored as the process data 25 in the storage means 20 of the data server 2a and are sent to the respective device control computers to be used to control the respective devices. The lens specifications and information necessary for the lens processing determined on the basis of the order data 22, design data 21, and process data 25 are printed on a process instruction. Computer-readable identification information (e.g., bar code) is also attached to this process instruction. Causing a computer to recognize this identification information makes it possible to specify manufacturing specifications for each lens.

In the factory 7, many kinds of semi-finished lens blanks (to be referred to as semi-finished lenses hereinafter) are manufactured and stocked in advance. Each semi-finished lens has only the first surface (convex surface) optically finished, with the second surface (concave surface) being formed to be thicker than the finished lens by a cutting margin and polishing margin. A lens to be processed is selected from the stocked semi-finished lenses in accordance with the process instruction and is placed on a belt conveyor, together with the process instruction, to be conveyed to the blocking step as the next step. Note that the process instruction is also attached to the lens in the subsequent steps.

Figure 14:
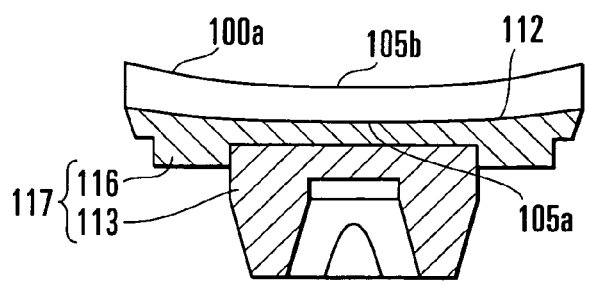
FIG. 14 is a sectional view of a lens on which a lens holding jig is mounted.

The blocking step in step S22 in FIG. 13 will be described next. The blocking step is a step of mounting a lens holding jig on the first surface (convex surface) of the lens. The lens holding jig is used to mount the lens on a cutting device and polishing device used in the cutting step and polishing step as the subsequent steps. FIG. 14 shows a cross-section of the lens on which the lens holding jig is mounted. A lens holding jig 117 is comprised of a lens holder unit 113 formed from a tool steel and the like and an adhesive 116 for bonding a lens 100a selected in the order receiving step to the lens holder unit 113. As the adhesive 116, for example, a low-melting alloy (to be referred to as an alloy hereinafter) is used. A protective film 112 for preventing flaws is placed in tight contact with a convex surface 105a of the lens 100a in advance.

The commercially available blocker 700 can be used to mount the lens holding jig 117 on the lens 100a. As the blocker 700, for example, a layout blocker available from LOH can be used. The lens holder unit 113 is placed on the convex surface 105a side of the lens 100a with a space left therebetween by using the blocker 700. A block ring is placed around the space, and the space formed between the convex surface 105a and the lens holder unit 113 by the blocking ring is filled with a molten alloy, which is then cooled/solidified. The block ring is removed, and the lens holding jig 117 is mounted on the lens 100a. Note that there are a plurality of kinds of lens holder units 113 and blocking rings having different sizes (e.g., height, outer diameter, and inner diameter). The lens holder unit 113 and blocking ring having sizes determined in advance by the process data 25 are used.

When the blocking step is completed, the manufacturing record information (e.g., devices which have been used, process conditions, operators, and process date) of the lens based on the specifications is sent from the blocker control computer 70 to the data server 2a and stored as the manufacturing record data 26 in the storage means 20. The lens 100a on which the lens holding jig 117 is mounted is transferred to the cutting step as the next step.

The cutting step in step S23 in FIG. 13 will be described next. The cutting step is a step of cutting the second surface (concave surface) of a semi-finished lens into a predetermined surface shape with a polishing margin being left by using a cutting device. As the cutting device, for example, the commercially available curve generator 710 designed to perform three-dimensional NC control can be used. The lens 100a on which the lens holding jig 117 is mounted is mounted on the curve generator 710 by fitting a portion of the lens holder unit 113 in the mount portion of the curve generator 710. The curve generator 710 presses its cutting blade against a concave surface 105b of the lens while rotating the lens 100a, and moves the blade vertically and horizontally to cut the lens surface into a predetermined surface shape. The surface shape into which the lens surface is to be cut is determined in advance by the process data 25.

When the cutting step is completed, the manufacturing record information (e.g., devices which have been used, process conditions, operators, and process date) of the lens 100a is sent from the curve generator control computer 71 to the data server 2a and stored as the manufacturing record data 26 in the storage means 20. The cut lens 100a is transferred to the polishing step as the next step.

Figure 15:
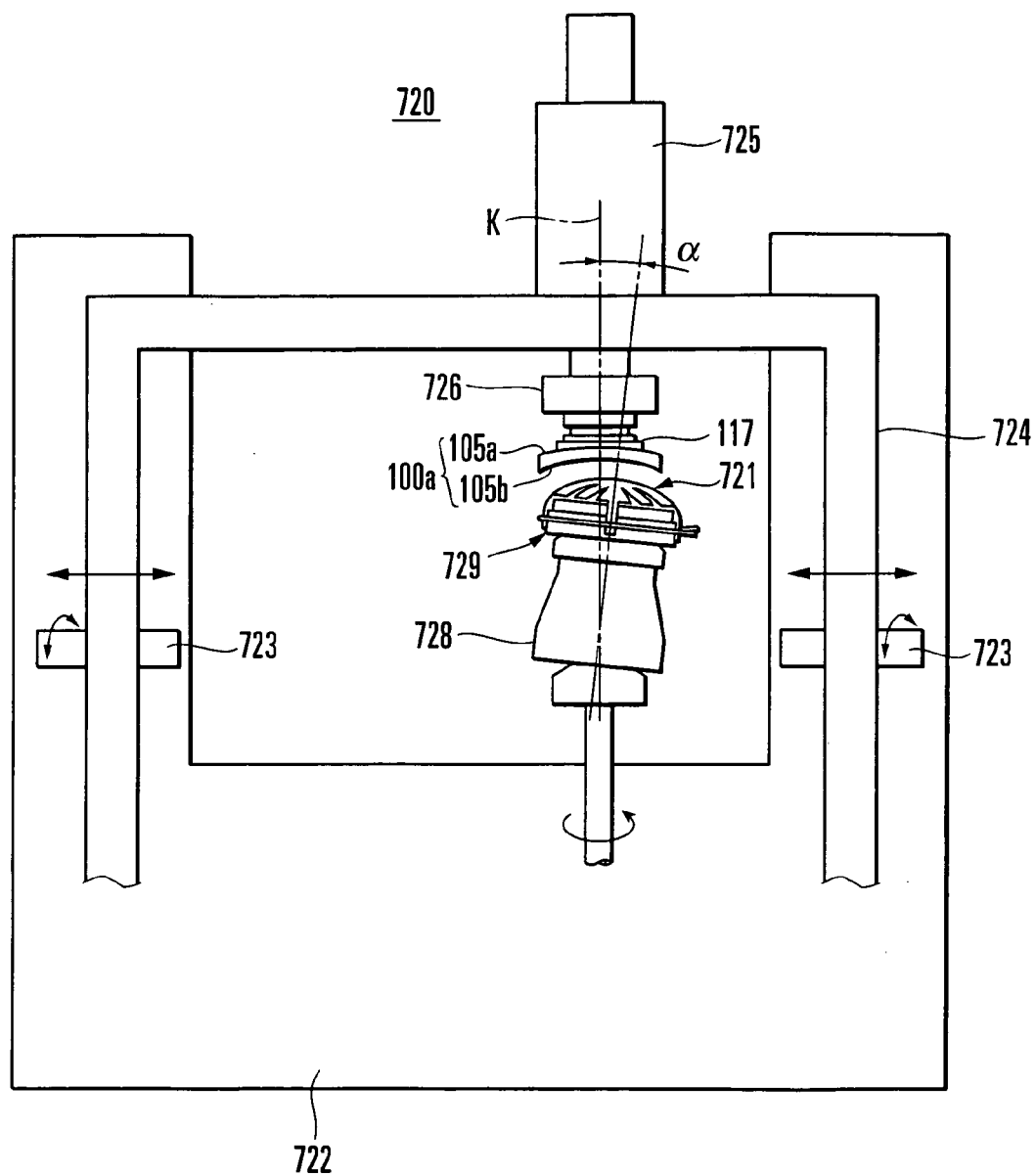
FIG. 15 is a view showing the schematic arrangement of a polishing device.

The polishing step in step S24 in FIG. 13 will be described next. The polishing step is a step of optically finishing the second surface of the cut lens 100a by polishing it. In the cutting step, small steps are formed on the lens due to the backlash and the like of the cutting device. Such steps are removed by polishing. The commercially available polishing device 720 can be used to polish the concave surface 105b of the lens 100a. As the polishing device 720, for example, a general-purpose polishing device (TORO-X2SL) available from LOH can be used. FIG. 15 shows the schematic arrangement of the polishing device 720.

Referring to FIG. 15, the polishing device 720 includes a device body 722 installed on a floor surface, an arm 724 which is placed in the device body 722 so as to freely move in the horizontal direction on the drawing surface and freely pivot about horizontal shafts 723 in a direction perpendicular to the drawing surface, a driving device (not shown) which causes the arm 724 to reciprocally move in the horizontal direction and pivot in the direction perpendicular to the drawing surface, a lens mount portion 726 which is provided on the arm 724 to hold the convex surface 105a of the lens 100a through a lens holding member 7, a swinging device 728 which is provided in the device body 722 so as to be located below the lens mount portion 726 and is swung/swiveled (not rotated) about a vertical axis K by a driving device (not shown), and the like. The polishing device 720 includes a polishing jig 729 detachably mounted on the swinging device 728, a polishing pad 721 detachably mounted on the polishing jig 729, an elevating device 725 which vertically moves the lens mount portion 726, and the like. As the polishing jig 729, a metal tray on which a surface shape into which the lens is to be polished is formed, a polishing jig formed by encapsulating a fluid in a polishing portion formed from an elastic member and bulging the polishing portion into a predetermined shape, or the like can be used. In some cases, polishing cannot be done by a metal tray if the second surface to be polished has a complicated shape, e.g., an aspherical surface, atoric surface, or free-form surface. For this reason, the polishing jig 729 formed from an elastic member is preferably used. There are a plurality of kinds of polishing jigs 729 in correspondence with surface shapes to be obtained by polishing. Therefore, the polishing jig 729 determined in advance by the process data 25 is used.

When the polishing step is completed, the manufacturing record information (e.g., devices which have been used, process conditions, operators, and process date) of the lens 100a is sent from the polishing control computer 72 to the data server 2a and stored as the manufacturing record data 26 in the storage means 20. The lens holding jig 117 is removed from the lens 100a having undergone the polishing step. The lens is then transferred to the lens evaluation step as the next step.

The lens evaluation step in step S25 in FIG. 13 will be described next. The lens evaluation step corresponds to the spectacle lens evaluation apparatus of the first embodiment (dioptric power distribution measuring device 1, data server 2a, evaluation computer 3, input means 4, and output means 5). In this step, the same process as that described in the first embodiment is performed, and hence a description thereof will be omitted. Of the lenses 100a having passed the test in the lens evaluation step, lenses which need to be dyed are transferred to the dyeing step, and lenses which need not be dyed are transferred to the surface treatment step.

The dyeing step in step S26 in FIG. 13 will be described next. The dyeing step is a step of dyeing the lens 100a. Various methods are practiced as dyeing methods. For example, there is available a method of heating a dye liquid, keeping a plastic lens dipped in the heated dye liquid for a predetermined period of time, and heating the lens to further disperse the dye penetrating the lens, thereby stabilizing the dye. The following are available as dye liquids: a dye liquid obtained by dissolving and suspending a disperse dye in water, a dye liquid obtained by dissolving a disperse dye in water, and a dye liquid obtained by suspending a disperse dye in water. The lens 100a is dyed in the color designated by the order data 22. If there is a color sample, the lens is dyed in a color similar to it. The dyed lens 100a is transferred to the surface treatment step as the next step.

The surface treatment step in step S27 in FIG. 13 will be described next. The surface treatment step is a step of applying a surface treatment, e.g., forming a hard coat, antireflection film, water stain preventing coat, or soil-resistant film, on a surface of the lens 100a. A hard coat is used to increase the hardness of a lens surface. This film is formed by coating the lens surface with an organic material such as a silicon-based resin by the dipping or spin coating method and heating/setting the resin. An antireflection film is used to prevent the reflection of light by a lens surface and increase its transmittance. This film is formed by depositing multiple inorganic oxide layers by the vacuum deposition method. One of these surface treatments which is designated by the order data 22 is executed. The lens 100a having undergone the surface treatment is transferred to the test step as the next step.

The test step in step S28 in FIG. 13 will be described next. In the test step, a visual test of the lens 100a, a test of optical characteristics at a predetermined measurement position (e.g., optical center), a test of the thickness of the lens 100a, and the like are performed. The lens meter 730 and thickness meter 731 are connected to the test step management computer 73. The test step management computer 73 compares the measurement value obtained at a predetermined measurement position by the lens meter 730 and thickness meter 731 with the lens specifications based on the order data 22 and design data 21, thereby determining whether the lens 100a passes the test. A mark indicting an optical center is recorded on the lens 100a having passed the test.

When the test step is completed, the test result on the lens 100a is stored as the manufacturing record data 26 in the storage means 20 of the data server 2a. If the order data 22 includes no edging/beveling process instruction, the lens 100a is shipped to the orderer upon completion of the test step. If the order data 22 includes an edging/beveling process instruction, the lens 100a is transferred to the edging/beveling step as the next step.

The edging/beveling process step in step S29 in FIG. 13 will be described next. The edging/beveling process step is a step of mounting the lens holding jig 117 on the lens 100a, cutting a spectacle into a predetermined shape with a polishing device, processing the edge of the lens 100a to allow it to be attached to a frame, and testing the peripheral length and shape of the lens 100a. The marker 740 and image processing unit 741 are connected to the marker control computer 74. In accordance with the process data 25, the marker control computer 74 determines a blocking position at which the lens 100a should be blocked (held) when the lens 100a is to be edged and beveled, and controls the image processing unit 741 and marker 740 to record a blocking position mark on the lens 100a. A holding jig for blocking is fixed to the lens 100a in accordance with this blocking position mark.

The NC-controlled lens polishing device 750 and chuck interlock 751 formed from machining centers are connected to the edging/beveling process control computer 75. The edging/beveling process control computer 75 performs an edging process and beveling process for the lens 100a by controlling these devices in accordance with the process data 25.

The shape measuring device 760 for a beveled apex is connected to the shape measuring device control computer 76. The shape measuring device control computer 76 performs pass/fail determination by comparing the process data 25 with the peripheral length and shape of the beveled lens 100a, measured by the shape measuring device 760. Each lens 100a having passed this test is subjected to a visual test, optical characteristic test, thickness test, and the like again. Each lens 100a having passed the tests is sent to the orderer. If the orderer has also ordered a frame, each lens is sent to him/her while being attached to the frame.

The pieces of manufacturing record information (e.g., devices which have been used, process conditions, operators, and process date) of the lens 100a are sent from the marker control computer 74, edging/beveling process control computer 75, and shape measuring device control computer 76 to the data server 2a and stored as the manufacturing record data 26 in the storage means 20.

The spectacle lens manufacturing method and system according to the second embodiment of the present invention evaluates a lens by comparing the optical performance based on design values with the actual optical performance in a wide range of a lens surface after the completion of a cutting/polishing process for a semi-finished lens. Therefore, the method and system can find process failures due to cutting and polishing in an early stage. In addition, any lens determined as "fail" as a result of evaluation is not transferred to the subsequent steps. This prevents the execution of unnecessary operation in the subsequent steps. Since a process failure in a lens can be found before a step requiring a relatively long period of time, e.g., the dyeing step or surface treatment step, in particular, the lens manufacturing time can be shortened.

Even if a dioptric power and thickness at the optical center are obtained in conformity with lens specifications, a large error may occur between the lens shape after the cutting/polishing step and that based on design values. Such an error may cause a trouble in the edging/beveling process step. In the second embodiment, however, since the lens evaluation step is set before the edging/beveling process step, the number of failures in an edging/beveling process can be reduced.

In the second embodiment, since the manufacturing record data 26 in each step and measurement and pass/fail determination result data 24 obtained by the lens evaluation apparatus are stored for each ordered lens, the stored information can be used as an important material for specifying failure causes and improving quality. For example, with regard to a lens determined as "fail" by lens evaluation, the failure cause can be easily specified by analyzing the manufacturing record data 26 in the blocking step, cutting step, and polishing step.

[Third Embodiment]

This embodiment is associated with a spectacle lens manufacturing method and system in which the lens evaluation method and apparatus according to the first embodiment are applied to the manufacture of spectacle plastic lenses. The embodiment exemplifies a case wherein lenses with the same specifications are mass-produced. The third embodiment will be described below with reference to the accompanying drawings.

Figure 16:
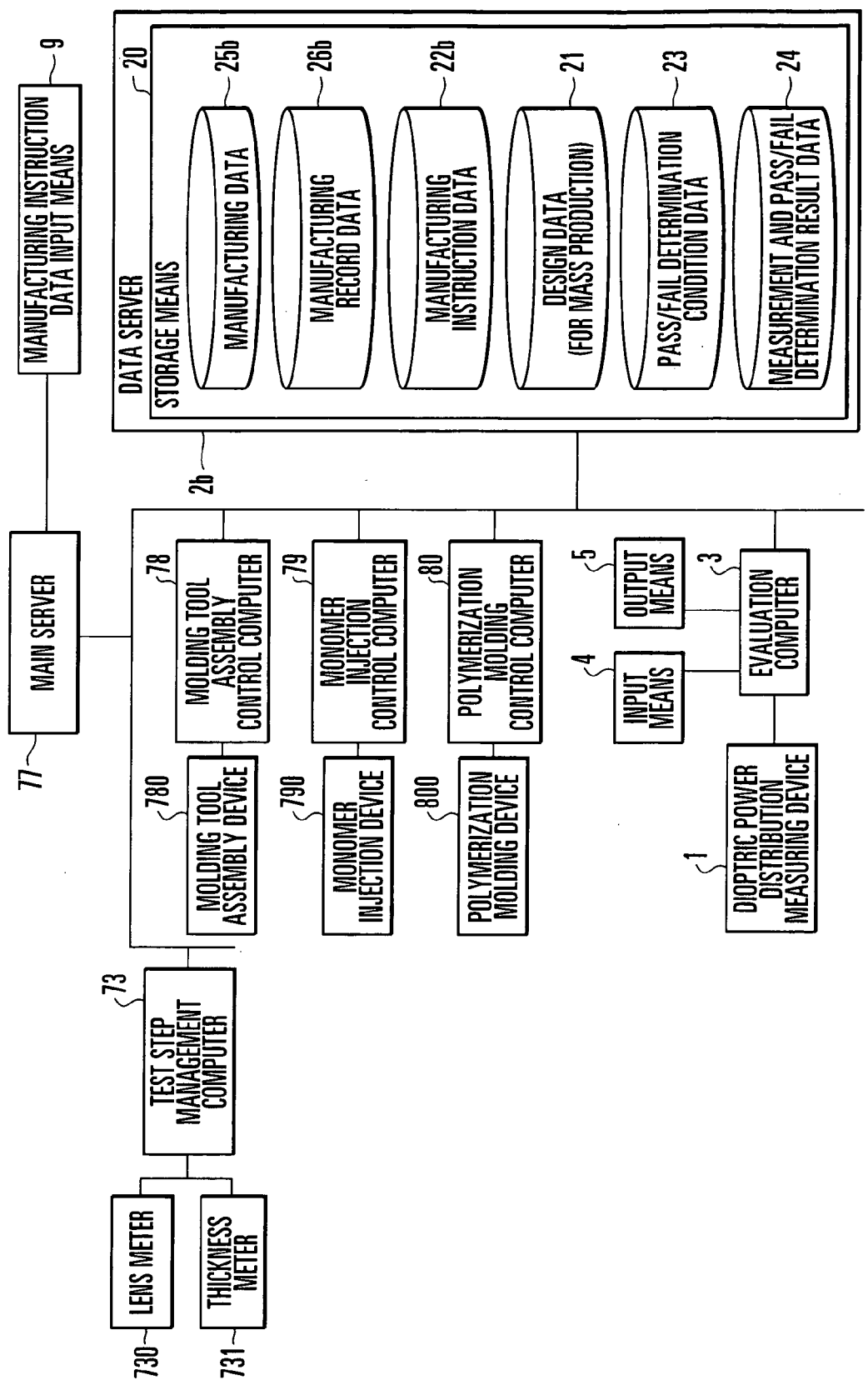
FIG. 16 is a block diagram showing the schematic arrangement of a mass-production spectacle lens manufacturing system according to the third embodiment of the present invention.

FIG. 16 is a block diagram showing the schematic arrangement of a mass-production spectacle lens manufacturing system. This mass-production spectacle lens manufacturing system includes a dioptric power distribution measuring device 1 for measuring the optical performance of a mass-production lens throughout a wide range, an evaluation computer 3 for calculating the optical performance of the mass-production lens on the basis of design values and comparing the optical performance based on the design values with the actual optical performance measured by the dioptric power distribution measuring device 1 through a wide range of the lens, thereby evaluating the lens, an input means 4 for inputting data for identifying a lens to the evaluation computer 3, an output means 5 for outputting the evaluation result obtained by the evaluation computer 3, and a data server 2b which is a computer for storing data necessary for the evaluation of a mass-production lens (manufacturing instruction data 22b, design data 21, and pass/fail determination condition data 23), lens measurement/evaluation results, and lens manufacturing data 25b in each lens manufacturing step. The mass-production spectacle lens manufacturing system further includes a test step management computer 73, a lens meter 730 and thickness meter 731 controlled/managed by the test step management computer 73, a molding tool assembly control computer 78, a molding tool assembly device 780 controlled/managed by the molding tool assembly control computer 78, a monomer injection control computer 79, a monomer injection device 790 controlled/managed by the monomer injection control computer 79, a polymerization molding control computer 80, a polymerization molding device 800 controlled/managed by the polymerization molding control computer 80, a main server 77 serving as a computer for providing information necessary for lens manufacturing to the test step management computer 73, molding tool assembly control computer 78, monomer injection control computer 79, and polymerization molding control computer 80, and a manufacturing instruction data input means 9 for inputting the manufacturing instruction data 22b including the type of lens to be mass-produced, a manufacturing method, and the like to the main server 77.

In this embodiment, the test step management computer 73, molding tool assembly control computer 78, monomer injection control computer 79, and polymerization molding control computer 80 will be generically called device control computers. The main server 77, data server 2b, evaluation computer 3, and device control computers are connected to each other through a network.

The portions corresponding to the spectacle lens evaluation apparatus described in the first embodiment, i.e., the dioptric power distribution measuring device 1, data server 2b, evaluation computer 3, input means 4, and output means 5 are the same as those in the first embodiment except that the order data 22 stored in a storage means 20 of the data server 2b is replaced with the manufacturing instruction data 22b, a description thereof will be omitted except for different points. Note that in the data server 2b, the following data are recorded on the storage means 20: the manufacturing data 25b as manufacturing information which is recorded for each lens and sent to each device control computer and manufacturing record data 26b as manufacturing information which is recorded for each lens in each step and sent from each device control computer. The devices controlled/managed by the respective device control computers will be described later. Note that the network arrangement on the factory 7 side is not limited to that in this embodiment, and the functions of the respective computers may be integrated and distributed in and to computers and network devices on the network.

Figure 17:
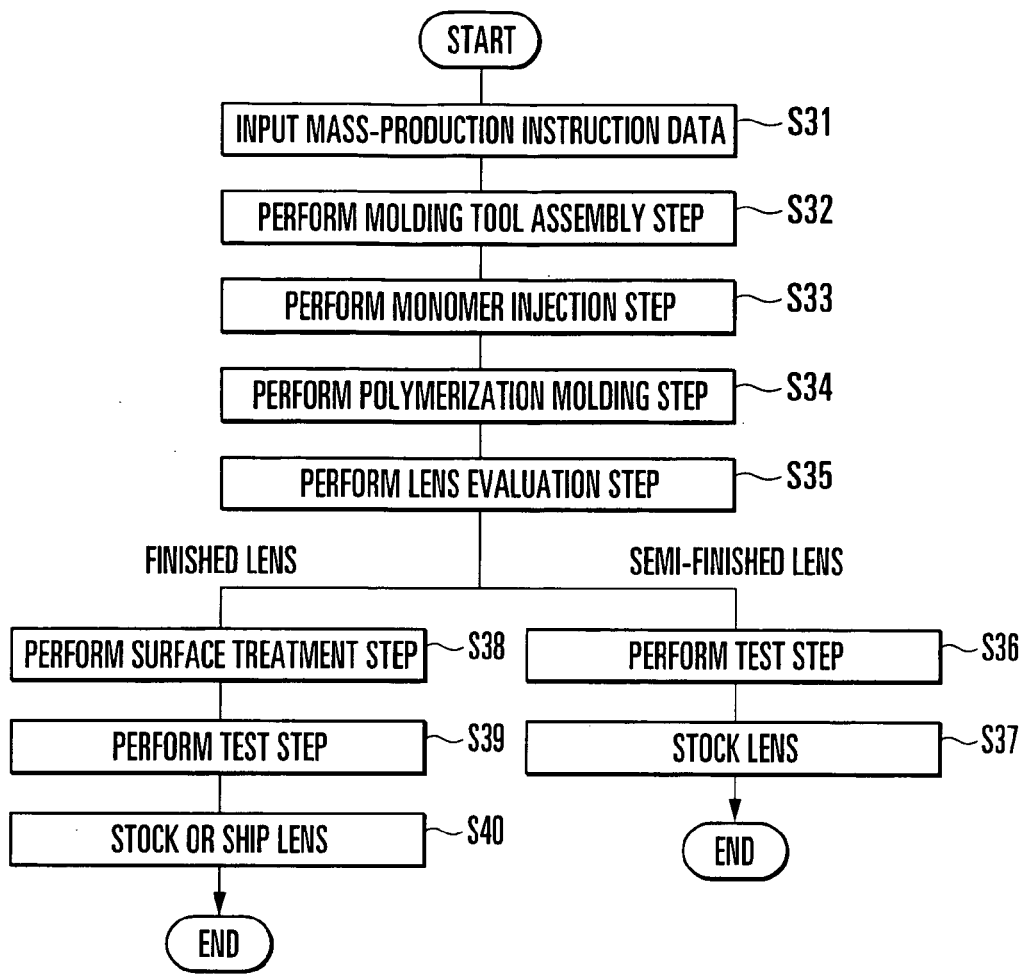
FIG. 17 is a flow chart showing the flow of mass-production lens manufacturing steps in the third embodiment of the present invention.

The flow of lens mass production will be described next. FIG. 17 is a flow chart showing the flow of manufacturing steps for a mass-production lens. Lenses to be mass-produced include a finished lens having the first and second surfaces optically finished and a semi-finished lens having only the first surface optically finished, with the second surface being formed to be thicker than the finished lens by a cutting margin and polishing margin.

First of all, the manufacturing instruction data 22b is input from the manufacturing instruction data input means 9 to the main server 77 (step S31 in FIG. 17). The manufacturing instruction data 22b includes information associated with the type of lens to be mass-produced (e.g., product identification symbol, lens material, refractive index, optical designs of lens upper and lower surfaces, lens outer diameter, and coating), information associated with the dioptric power of the lens (e.g., S power, C power, prism, and addition), and information associated with lens manufacturing (e.g., number of lenses to be manufactured, manufacturing date, manufacturing line, and manufacturing sequence).

Upon reception of the manufacturing instruction data 22b, the main server 77 determines manufacturing conditions necessary for the respective manufacturing steps (e.g., gasket to be used for lens manufacturing, mold, monomer, other jigs to be used, molding tool assembly conditions, monomer injection conditions, and polymerization molding conditions) on the basis of the manufacturing instruction data 22b. These manufacturing conditions are determined in advance for each type of lens that can be specified from a lens type and lens dioptric power. The determined manufacturing conditions are stored as the lens manufacturing data 25b in the storage means 20 of the data server 2b and sent to the respective device control computers to be used to control the respective devices. In addition, information necessary for lens manufacturing based on the manufacturing instruction data 22b and lens manufacturing data 25b is printed as a manufacturing instruction for each step and displayed on a display screen. Note that the design values for various kinds of lenses (the three-dimensional shape data of the first and second surfaces and lens thicknesses) are stored as the design data 21 in the storage means 20 of the data server 2b, and the design values for a given lens can be specified from a lens type and lens dioptric power. It is preferable that the three-dimensional shape data be expressed by a spline function.

As a method of molding a plastic lens, an injection polymerization method is known. In this method of molding a lens, a molding tool is assembled first (molding tool assembly step), and a monomer as a lens material which is a thermosetting resin is injected into this molding tool (monomer injection step). The molding tool is then placed in a high-temperature furnace to be heated/polymerized (polymerization molding step). The lens having undergone polymerization is removed from the tool, thus molding the lens.

The molding tool assembly step in step S32 in FIG. 17 will be described below. The molding tool assembly step is a step of assembling molds (top and lower molds) in a gasket to form a molding tool for injection polymerization.

Figure 18:
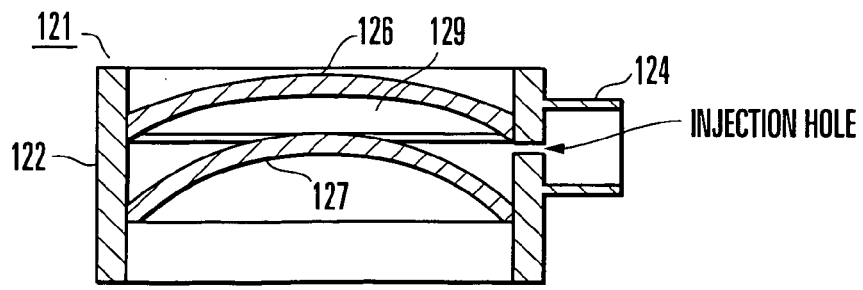
FIG. 18 is a sectional view of a molding tool.

FIG. 18 is a sectional view of a molding tool. A molding tool 121 is constituted by a gasket 122, upper mold 126, and lower mold 127. The gasket 122 is made of an elastic resin, and its main portion has a cylindrical shape. A monomer injection portion 124 is formed on the outer wall surface of this cylindrical portion. The monomer injection portion 124 communicates with the interior of the cylindrical portion through an injection hole formed in the cylindrical portion. The upper mold 126 and lower mold 127 are made of glass and are arranged on the inner wall of the cylindrical portion with a space left therebetween. The upper mold 126 has a surface for forming the first surface of a lens. The lower mold 127 has a surface for forming the second surface of the lens. The above injection hole communicates with a cavity 129 formed by the gasket 122 and molds 126 and 127.

The molding tool 121 is assembled by the molding tool assembly device 780. As the gasket 122, upper mold 126, and lower mold 127, those determined by the manufacturing data 25*b* are used. In addition, the space between the molds 126 and 127 and the like are set in accordance with the lens manufacturing data 25*b*.

When the molding tool assembly step is completed, the manufacturing record information of this lens (e.g., devices which have been used, manufacturing conditions, operators, and manufacturing date) is sent from the molding tool assembly control computer 78 to the data server 2*b* and stored as the manufacturing record data 26*b* in the storage means 20. The assembled molding tool 121 is transferred to the monomer injection step as the next step.

The monomer injection step in step S33 in FIG. 17 will be described next. The monomer injection step is a step of injecting a liquid monomer as a material for a lens into the molding tool 121. The molding tool 121 is held with the monomer injection portion 124 facing up, and a thermosetting monomer is injected through the monomer injection portion 124. This operation is automatically performed by the monomer injection device 790. The type of monomer to be injected, injection conditions, and the like are designated by the manufacturing data 25*b*.

When the monomer injection step is completed, the manufacturing record information of this lens (e.g., devices which have been used, manufacturing conditions, operators, and manufacturing date) is sent from the monomer injection control computer 79 to the data server 2*b* and stored as the manufacturing record data 26*b* in the storage means 20. The molding tool 121 having undergone the injection step is transferred to the polymerization molding step as the next step.

The polymerization molding step in step S34 in FIG. 17 will be described next. The polymerization molding is a step of polymerizing/setting the monomer injected into the molding tool 121. The molding tool 121 in which the thermosetting monomer is injected is placed in the electric furnace of the polymerization molding device 800 to be heated/polymerized. The electric furnace is temperature-controlled to undergo a predetermined temperature change for a predetermined time. The temperatures and time in this case are designated by the manufacturing data 25*b*. When the polymerization is completed, the molding tool 121 is removed from the electric furnace, and the gasket 122 and molds 126 and 127 are removed, thereby forming a lens.

When the polymerization molding step is completed, the manufacturing record information of this lens (e.g., devices which have been used, manufacturing conditions, operators, and manufacturing date) is sent from the polymerization molding control computer 80 to the data server 2*b* and stored as the manufacturing record data 26*b* in the storage means 20. The molded lens is transferred to the lens evaluation step as the next step.

Figure 19:
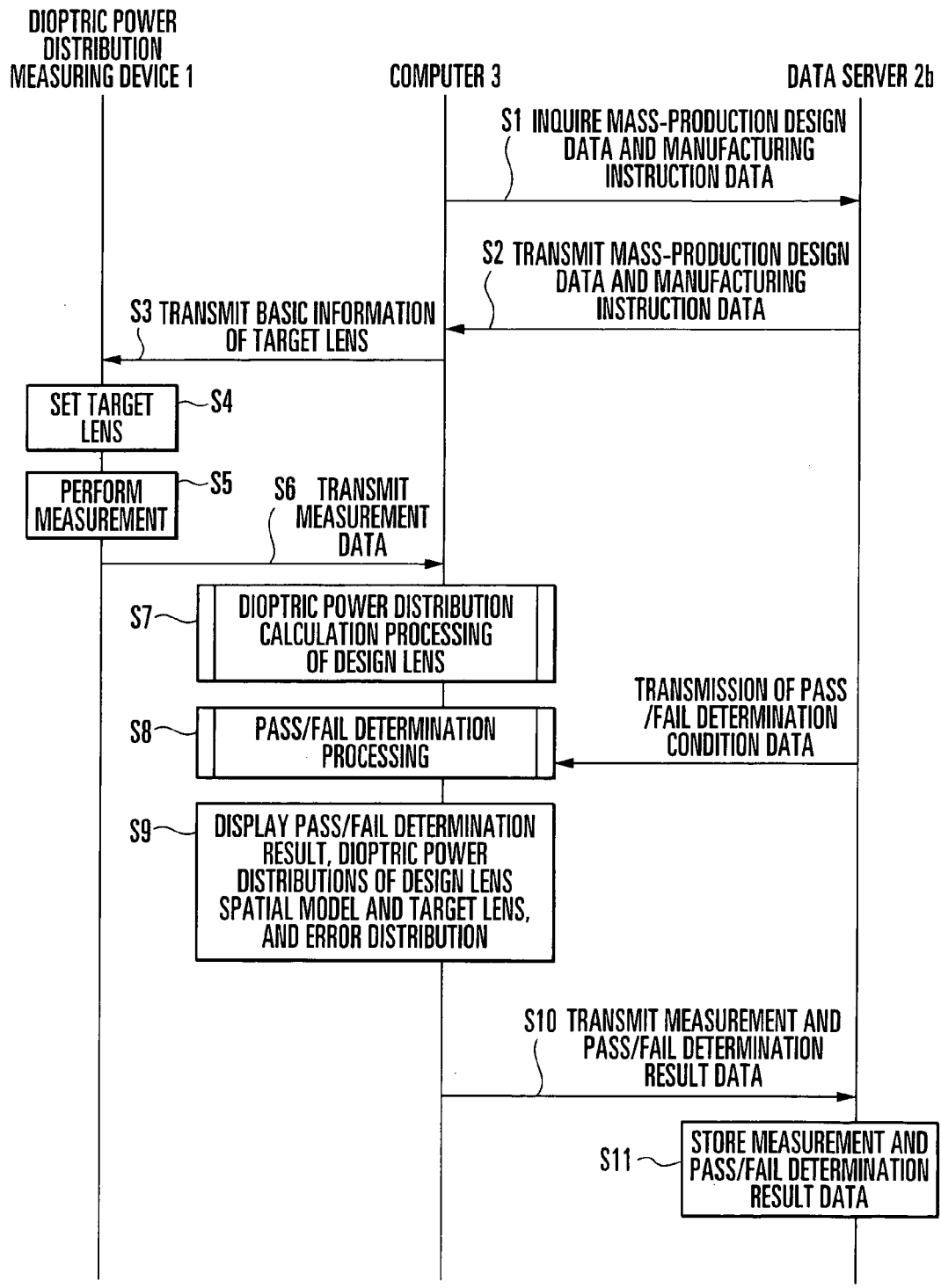
FIG. 19 is a sequence chart showing the operation of a spectacle lens evaluation apparatus according to the third embodiment of the present invention.

The lens evaluation step in step S35 in FIG. 17 will be described next. The lens evaluation step is performed by the portions corresponding to the spectacle lens evaluation apparatus according to the first embodiment (the dioptric power distribution measuring device 1, data server 2*b*, evaluation computer 3, input means 4, and output means 5). FIG. 19 shows the operation of the spectacle lens evaluation apparatus in evaluation of a mass-production lens. This embodiment is the same as the first embodiment except that the design data 21 and order data 22 in the first embodiment are replaced with the mass-production design data 21 and manufacturing instruction data 22*b*, respectively.

Of the lenses determined as "pass" as a result of lens evaluation, semi-finished lenses are transferred to the test step (step S36), and lenses determined as "pass" in the test step are stocked (step S37). The stocked lenses are used to manufacture custom-designed lenses as described in the second embodiment.

Finished lenses undergo the surface treatment step (step S38). Thereafter, lenses determined as "pass" in the test step (step S39) are stocked or shipped to an optician's store or the like (step S40). When a custom-designed lens is to be formed by using a finished lens, since the second surface of the finished lens has been finished, the manufacturing process is started from the edging/beveling process step described in the second embodiment, and the resultant lens is shipped to the orderer. Note that the surface treatment step in step S38 and the test step in step S39 are the same as those in steps S27 and S28 in the second embodiment, and hence a description thereof will be omitted.

The spectacle lens manufacturing method and system according to the third embodiment of the present invention evaluates a lens by comparing the optical performance based on design values and the actual optical performance in a wide range of a lens surface after the completion of polymerization molding of the lens. Therefore, the method and system can find a failure due to polymerization molding in an early stage. In addition, in the third embodiment, any lens exhibiting an error larger than a predetermined condition is determined as "fail" and is not transferred to the subsequent steps. This prevents the execution of unnecessary operation in the subsequent steps. Since a failure in a lens can be found before a step requiring a relatively long period of time, e.g., the surface treatment step, in particular, the lens manufacturing time can be shortened.

Even if a dioptric power and thickness at the optical center are obtained in conformity with lens specifications, a large error may occur between the shapes of the upper and lower surfaces of the lens and those based on design values. Since such a lens is removed in the lens evaluation step, a lens that conforms to design values throughout a wide range of the lens can be manufactured.

In the third embodiment, since the manufacturing record data 26*b* in each step and measurement and pass/fail determination result data 24 obtained by the lens evaluation apparatus are stored for each mass-production lens, the stored information can be used as an important material for specifying failure causes and improving quality.

[Fourth Embodiment]

This embodiment exemplifies a case wherein the lens evaluation method and apparatus according to the first embodiment are applied to the evaluation of the molds of a molding tool used for the manufacture of spectacle plastic lenses. As described in the third embodiment, the molds are made of glass and include top and lower molds. The upper mold has a molding surface (concave surface) for molding the first surface of a spectacle lens, and the other surface has a predetermined surface shape. The lower mold has a molding surface (convex surface) for molding the second surface of the spectacle lens, and the other surface has a predetermined surface shape. Since the molding surfaces of the molds are transferred to a plastic lens, each molding surface needs to have as high surface precision as that of the glass lens. One surface of each mold is a lens molding surface, and the opposite surface has a predetermined surface shape. For this reason, the mold has predetermined optical characteristics like a lens. Errors in the surface shape of a target mold in a wide range can be measured and determined by measuring optical performance using the lens evaluation method and apparatus according to the first embodiment and comparing the measured optical performance with the optical performance calculated from design values.

FIG. 20 is a block diagram showing the schematic arrangement of a mold evaluation apparatus according to the fourth embodiment of the present invention. The mold evaluation apparatus of the fourth embodiment is comprised of a dioptric power distribution measuring device 1 which measures the dioptric power distribution of a target mold, a data server 2c which stores data necessary for the evaluation of the target mold and an evaluation result, an evaluation computer 3 which evaluates the target mold with respect to design values from the data stored in the data server 2c and the data measured by the dioptric power distribution measuring device 1, an input means 4 for inputting data for identifying the target mold to be evaluated to the evaluation computer 3, and an output means 5 for outputting the evaluation result obtained by the evaluation computer 3.

The dioptric power distribution measuring device 1 is identical to that in the first embodiment, and hence a description thereof will be omitted. The data server 2c is a computer having a data storage means connected to the evaluation computer 3 through a network. The data server 2c has a storage means 20 which stores data necessary for the evaluation of a target mold and an evaluation result. The storage means 20 is constituted by a design data storage means for storing design data 21c for molding in advance, a manufacturing instruction data storage means for storing manufacturing instruction data 22c for molding in advance, a pass/fail determination condition storage means for storing pass/fail determination condition data 23 in advance, and a measurement and pass/fail determination result storage means for storing measurement and pass/fail determination result data 24 in advance.

Design values for a target mold are determined on the basis of the design data 21c and manufacturing instruction data 22c. The design data 21c includes the three-dimensional shape data of the convex and concave surfaces of the target mold, data associated with the thickness between the convex and concave surfaces of the mold, e.g., the mold center thickness and prism value, and material parameters such as the refractive index and Abbe number of the target mold. It is preferable that the three-dimensional shape data be expressed by a spline function. The manufacturing instruction data 22c includes information associated with mold specifications (e.g., mold identification symbol, mold material, refractive index, optical design of molding surface of mold, mold outer diameter, mold thickness, refractive power of molding surface, base curve of molding surface, base curve of surface (outer surface) other than molding surface, and shape of mold edge portion) and information associated with manufacturing (e.g., number of lenses to be manufactured, manufacturing date, manufacturing method, and manufacturing sequence). The pass/fail determination condition data 23 is identical to that in the first embodiment, and hence a description thereof will be omitted. In addition, since the input means 4 and output means 5 are identical to those in the first embodiment, a description thereof will be omitted.

Figure 21:
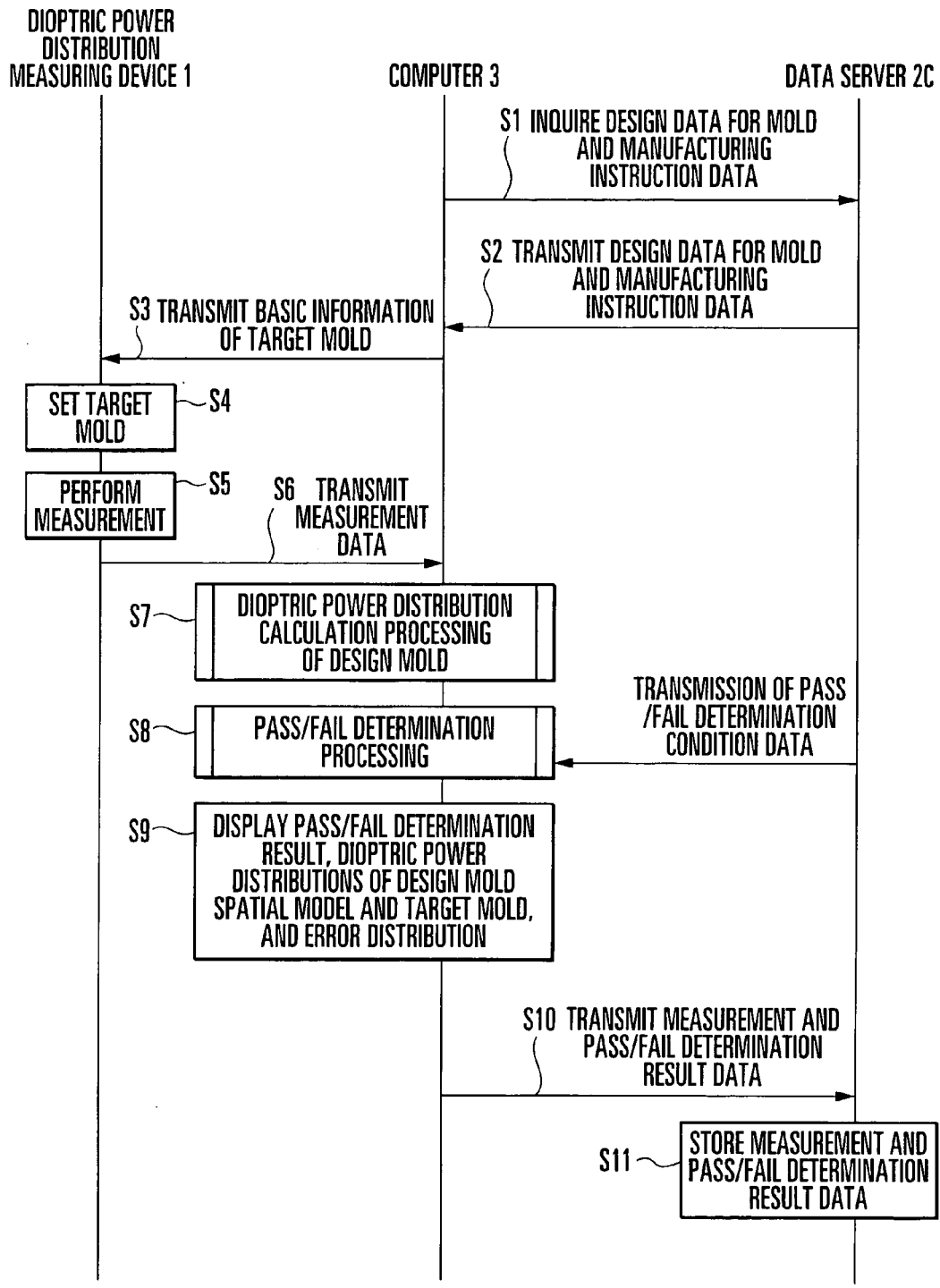
FIG. 21 is a sequence chart showing the operation of the mold evaluation apparatus in FIG. 20.

The operation of the above mold evaluation apparatus will be described next. FIG. 21 is a sequence chart showing the operation of the mold evaluation apparatus. This embodiment is the same as the first embodiment except that a target mold and design mold spatial model are used in place of the target lens and design lens spatial model, respectively, and the design data 21 and order data 22 in the first embodiment are replaced with the design data 21 for molding and the manufacturing instruction data 22c, respectively.

First of all, the bar code of the manufacturing instruction attached to a target mold to be measured is read by the input means (bar code reader) 4 and sent to the evaluation computer 3. The evaluation computer 3 sends identification data indicated by the bar code read by the input means 4 to the data server 2c to inquire the design data 21c and manufacturing instruction data 22c corresponding to the identification data (step S1 in FIG. 21).

Upon reception of the identification data from the evaluation computer 3, the data server 2c extracts the design data 21c and manufacturing instruction order data 22 corresponding to the identification data from the storage means 20 and transmits them to the evaluation computer 3 (step S2). The evaluation computer 3 transmits, to the dioptric power distribution measuring device 1, the basic information of the target mold (e.g., three-dimensional shape data of molding surface and outer surface, mold center thickness, and outer diameter of mold lens), of the design data 21c and manufacturing instruction data 22c received from the data server 2c, which are required for measurement by the dioptric power distribution measuring device 1 (step S3). Since the subsequent operation is the same as that in the first embodiment, a description thereof will be omitted. In addition, since the same determination method as that in the first embodiment is used, a description thereof will be omitted.

According to the mold evaluation method and apparatus of the fourth embodiment described above, the first surface of a target mold is irradiated with light, and the optical paths of exit light beams emerging from a plurality of measurement points on the second surface on the opposite side are measured, thereby calculating the dioptric power distribution of the target mold on the basis of the measurement result. This can greatly shorten the measurement time as compared with a case wherein a contact type three-dimensional measuring device is used. In addition, a design mold spatial model is constructed on the basis of design values. Light directly opposite to exit light having undergone optical path measurement is caused to be incident at the same position as a measurement point on the second surface of the design mold spatial model, and a light exit position on the first surface of the design mold spatial model is calculated. The same light as that used in the measurement sequence is applied at the calculated light exit position of the design mold spatial model, and the optical paths of exit light beams emerging from a plurality of measurement points on the second surface of the design mold spatial model are calculated. The dioptric power distribution of the design mold spatial model is calculated on the basis of the calculated optical paths of the exit light beams. The error distribution of the dioptric power distribution of the target mold with respect to the dioptric power distribution of the design mold spatial model is then calculated. With this operation, in the design mold spatial model, simulation processing for incident/exit light is performed with respect to only the same point as a measurement point of the target lens, thereby calculating the dioptric power distribution of the design mold spatial model. The calculated dioptric power distribution is compared with the dioptric power distribution of the target mold measured by the dioptric power distribution measuring device 1. This makes it possible to easily and quickly calculate the dioptric power distribution of the design mold. As a consequence, the optical characteristics of various kinds of target molds in a wide range can be tested in a short period of time.

As has been described above, the evaluation method and apparatus for spectacle lenses or molds for molding spectacle lenses according to the present invention are suitable for testing the optical characteristics of various kinds of target lenses or target molds in a wide range within a short period of time.

The invention claimed is:

1. A spectacle lens evaluation method characterized by executing:
   the measurement step of, when a first surface of a target lens is irradiated with light, measuring optical paths of exit light beams emerging from a plurality of measurement points on a second surface on an opposite side;
   the target lens dioptric power distribution calculation step of calculating a dioptric power distribution of the target lens on the basis of the measurement result;
   the design lens spatial model construction step of constructing a design lens spatial model imitating optical characteristics of the target lens on the basis of design values registered in advance;
   the light exit position calculation step of calculating a light exit position on a first surface of the design lens spatial model, assuming that light directly opposite to the exit light having undergone optical path measurement is incident at the same position as the measurement point on a second surface of the design lens spatial model;
   the exit light optical path calculation step of calculating optical paths of exit light beams emerging from a plurality of measurement points on the second surface of the design lens spatial model, assuming that the same light as that in the measurement step is applied at the calculated light exit position of the design lens spatial model;
   the design lens dioptric power distribution calculation step of calculating a dioptric power distribution of the design lens spatial model on the basis of the calculated optical paths of the exit light beams; and
   the error distribution calculation step of calculating an error distribution of the dioptric power distribution of the target lens with respect to the dioptric power distribution of the design lens spatial model.

2. A spectacle lens evaluation method according to claim 1, characterized in that
   the spectacle lens evaluation method executes the pass/fail determination step of determining "pass"/"fail" of the target lens by collating the error distribution calculated in the error distribution calculation step with a preset pass/fail determination condition,
   the pass/fail determination condition is constituted by determination area segmentation for segmenting the target lens into a plurality of determination areas, and an error allowable condition set for each of the determination areas segmented in accordance with the determination area segmentation, and
   in the pass/fail determination step, the error distribution is segmented into a plurality of determination areas in accordance with the determination area segmentation, and "fail" is determined if at least one of the error distributions segmented as the plurality of determination areas does not satisfy the error allowable condition.

3. A spectacle lens evaluation method according to claim 2, characterized in that
   the error allowable condition is constituted by a dioptric power allowable error set for each determination area, and an allowable ratio obtained by setting, for each determination area, an allowance for a ratio of the number of measurement points at which the allowable error is not satisfied to the total number of measurement points in the determination area, and
   in the pass/fail determination step, a ratio of the number of measurement points at which the allowable error is not satisfied is calculated for each determination area, and "fail" is determined if at least one of the ratios calculated for the respective determination areas does not satisfy the allowable ratio.

4. A spectacle lens evaluation method according to claim 2, characterized in that the stricter error allowable conditions are set for determination areas closer to an optical center of the target lens.

5. A spectacle lens evaluation method according to claim 2, characterized in that the stricter error allowable conditions are set for determination areas closer to distance and near portions of the target lens.

6. A spectacle lens evaluation method according to claim 2, characterized in that in the pass/fail determination step, only a frame area specified by frame shape data of the target lens is set as the determination area, and a portion located outside the frame area of the target lens is excluded from the pass/fail determination.

7. A spectacle lens evaluation apparatus characterized by comprising:
   a dioptric power distribution measuring device which, when a first surface of a target lens is irradiated with light, measures optical paths of exit light beams emerging from a plurality of measurement points on a second surface on an opposite side, and calculates a dioptric power distribution of the target lens on the basis of the measurement result;
   storage means for storing design values for the target lens;
   design lens spatial model construction means for constructing a design lens spatial model imitating optical characteristics of the target lens on the basis of the design values;
   light exit position calculation means for calculating a light exit position on a first surface of the design lens spatial model, assuming that light directly opposite to the exit light having undergone optical path measurement is incident at the same position as the measurement point on a second surface of the design lens spatial model;
   exit light optical path calculation means for calculating optical paths of exit light beams emerging from a plurality of measurement points on the second surface of the design lens spatial model, assuming that the same light as that in measurement by said dioptric power distribution measuring device is applied at the calculated light exit position of the design lens spatial model;
   design lens dioptric power distribution calculation means for calculating a dioptric power distribution of the design lens spatial model on the basis of the calculated optical paths of the exit light beams; and
   error distribution calculation means for calculating an error distribution of the dioptric power distribution of the target lens with respect to the dioptric power distribution of the design lens spatial model.

8. A spectacle lens evaluation apparatus according to claim 7, characterized in that
said spectacle lens evaluation apparatus comprises
pass/fail determination condition storage means for storing a pass/fail determination condition constituted by determination area segmentation for segmenting the target lens into a plurality of determination areas, and an error allowable condition set for each of the determination areas segmented in accordance with the determination area segmentation, and
pass/fail determination means for determining "pass"/"fail" of the target lens by collating the error distribution calculated by said error distribution calculation means with the pass/fail determination condition, and
said pass/fail determination means segments the error distribution into a plurality of determination areas in accordance with the determination area segmentation, and determines "fail" if at least one of the error distributions segmented as the plurality of determination areas does not satisfy the error allowable condition.

9. A spectacle lens evaluation apparatus according to claim 8, characterized in that
the error allowable condition is constituted by a dioptric power allowable error set for each determination area, and an allowable ratio obtained by setting, for each determination area, an allowance for a ratio of the number of measurement points at which the allowable error is not satisfied to the total number of measurement points in the determination area, and
said pass/fail determination means calculates a ratio of the number of measurement points at which the allowable error is not satisfied for each determination area, and determines "fail" if at least one of the ratios calculated for the respective determination areas does not satisfy the allowable ratio.

10. A spectacle lens evaluation apparatus according to claim 8, characterized in that the stricter error allowable conditions are set for determination areas closer to an optical center of the target lens.

11. A spectacle lens evaluation apparatus according to claim 8, characterized in that the stricter error allowable conditions are set for determination areas closer to distance and near portions of the target lens.

12. A spectacle lens evaluation apparatus according to claim 8, characterized in that said pass/fail determination means sets only a frame area specified by frame shape data of the target lens as the determination area, and excludes a portion located outside the frame area of the target lens from the pass/fail determination.

13. A spectacle lens manufacturing method of manufacturing a spectacle lens on the basis of order data from a spectacle lens orderer side, characterized by comprising:
cutting/polishing a lens on the basis of the order data;
when a first surface of the cut/polished lens is irradiated with light, measuring optical paths of exit light beams emerging from a plurality of measurement points on a second surface on an opposite side, and calculating a dioptric power distribution of the ordered lens on the basis of the measurement result;
calculating a design lens dioptric power distribution from design values for the ordered lens based on the order data; and
evaluating the lens by calculating an error distribution of an actual dioptric power distribution with respect to the design lens dioptric power distribution.

14. A spectacle lens manufacturing system characterized by comprising:
a computer placed on a spectacle lens orderer side;
a manufacturer side computer which is so connected to receive order data sent from said orderer side computer;
storage means for storing design values for an ordered lens based on the order data;
a dioptric power distribution measuring device which, when a first surface of an ordered lens manufactured on the order data is irradiated with light, measures optical paths of exit light beams emerging from a plurality of measurement points on a second surface on an opposite side, and calculates a dioptric power distribution of the ordered lens on the basis of the measurement result;
design lens dioptric power distribution calculation means for calculating a dioptric power distribution on the basis of the design values; and
error distribution calculation means for calculating an error distribution of the dioptric power distribution measured by said dioptric power distribution measuring device with respect to the dioptric power distribution calculated by said design lens dioptric power distribution calculation means.

15. A spectacle lens manufacturing method of manufacturing a plurality of spectacle lenses with the same specifications, characterized by comprising:
molding a lens on the basis of manufacturing instruction data representing specifications of a lens to be manufactured;
when a first surface of the molded lens is irradiated with light, measuring optical paths of exit light beams emerging from a plurality of measurement points on a second surface on an opposite side, and calculating a dioptric power distribution of the lens on the basis of the measurement result;
calculating a design lens dioptric power distribution from design values for the lens based on the manufacturing instruction data; and
calculating an actual error distribution of a dioptric power distribution which corresponds the design lens dioptric power distribution, thus evaluating the lens.

16. A spectacle lens manufacturing system for manufacturing a plurality of spectacle lenses with the same specifications, characterized by comprising:
a computer which inputs manufacturing instruction data representing specifications of a lens to be manufactured;
storage means for storing design values for a lens based on the manufacturing instruction data;
a dioptric power distribution measuring device which, when a first surface of a lens manufactured on the basis of the manufacturing instruction data is irradiated with light, measures optical paths of exit light beams emerging from a plurality of measurement points on a second surface on an opposite side, and calculates a dioptric power distribution of the lens on the basis of the measurement result;
design lens dioptric power distribution calculation means for calculating a dioptric power distribution on the basis of the design values; and
error distribution calculation means for calculating an error distribution of the dioptric power distribution measured by said dioptric power distribution measuring device with respect to the dioptric power distribution calculated by said design lens dioptric power distribution calculation means.

17. An evaluation method for a lens-like mold used for spectacle lens molding, characterized by executing:

the measurement step of, when a first surface of a target mold is irradiated with light, measuring optical paths of exit light beams emerging from a plurality of measurement points on a second surface on an opposite side;

the target mold dioptric power distribution calculation step of calculating a dioptric power distribution of the target mold on the basis of the measurement result;

the design mold spatial model construction step of constructing a design mold spatial model imitating optical characteristics of the target mold on the basis of design values registered in advance;

the light exit position calculation step of calculating a light exit position on a first surface of the design mold spatial model, assuming that light directly opposite to the exit light having undergone optical path measurement is incident at the same position as the measurement point on a second surface of the design mold spatial model;

the exit light optical path calculation step of calculating optical paths of exit light beams emerging from a plurality of measurement points on the second surface of the design mold spatial model, assuming that the same light as that in the measurement step is applied at the calculated light exit position of the design mold spatial model;

the design mold dioptric power distribution calculation step of calculating a dioptric power distribution of the design mold spatial model on the basis of the calculated optical paths of the exit light beams; and the error distribution calculation step of calculating an error distribution of the dioptric power distribution of the target mold with respect to the dioptric power distribution of the design mold spatial model.

18. An evaluation apparatus for a lens-like mold used for spectacle lens molding, characterized by comprising:

a dioptric power distribution measuring device which, when a first surface of a target mold is irradiated with light, measures optical paths of exit light beams emerging from a plurality of measurement points on a second surface on an opposite side, and calculates a dioptric power distribution of the target mold on the basis of the measurement result;

storage means for storing design values for the target mold;

design mold spatial model construction means for constructing a design mold spatial model imitating optical characteristics of the target mold on the basis of the design values;

light exit position calculation means for calculating a light exit position on a first surface of the design mold spatial model, assuming that light directly opposite to the exit light having undergone optical path measurement is incident at the same position as the measurement point on a second surface of the design mold spatial model;

exit light optical path calculation means for calculating optical paths of exit light beams emerging from a plurality of measurement points on the second surface of the design mold spatial model, assuming that the same light as that in measurement by said dioptric power distribution measuring device is applied at the calculated light exit position of the design mold spatial model;

design mold dioptric power distribution calculation means for calculating a dioptric power distribution of the design mold spatial model on the basis of the calculated optical paths of the exit light beams; and error distribution calculation means for calculating an error distribution of the dioptric power distribution of the target mold with respect to the dioptric power distribution of the design mold spatial model.

* * * * *